United States Patent [19]
Coleman, Jr. et al.

[11] 3,958,899
[45] *May 25, 1976

[54] STAGED EXPANSION SYSTEM AS EMPLOYED WITH AN INTEGRAL TURBO-COMPRESSOR WAVE ENGINE

[75] Inventors: Richard R. Coleman, Jr., Malvern; Helmut E. Weber, Valley Forge, Pa.

[73] Assignee: General Power Corporation, Paoli, Pa.

[*] Notice: The portion of the term of this patent subsequent to May 21, 1991, has been disclaimed.

[22] Filed: Apr. 25, 1974

[21] Appl. No.: 464,101

Related U.S. Application Data

[62] Division of Ser. No. 191,410, Oct. 21, 1971, Pat. No. 3,811,796.

[52] U.S. Cl. .................................................. 417/64
[51] Int. Cl.² ...................... F04B 11/00; F02C 3/02
[58] Field of Search .................................. 417/64

[56] References Cited
UNITED STATES PATENTS

| | | | |
|---|---|---|---|
| 2,864,237 | 12/1958 | Coleman, Jr. | 417/64 X |
| 2,904,245 | 9/1959 | Pearson | 417/64 |
| 2,904,246 | 9/1959 | Pearson | 417/64 |

FOREIGN PATENTS OR APPLICATIONS

| | | | |
|---|---|---|---|
| 803,659 | 10/1958 | United Kingdom | 418/64 |

*Primary Examiner*—C. J. Husar
*Assistant Examiner*—Leonard Smith
*Attorney, Agent, or Firm*—William E. Cleaver

[57] ABSTRACT

The Present system provides for expanding high pressure gases from the chambers of a moving rotor and reentering said gases into the chambers of said moving rotor in such a way that the gases in the chambers of said moving rotor have been subjected to more expansions than the gases reentering the chambers and therefore are at a lower pressure than the gases reentering said chambers.

9 Claims, 23 Drawing Figures

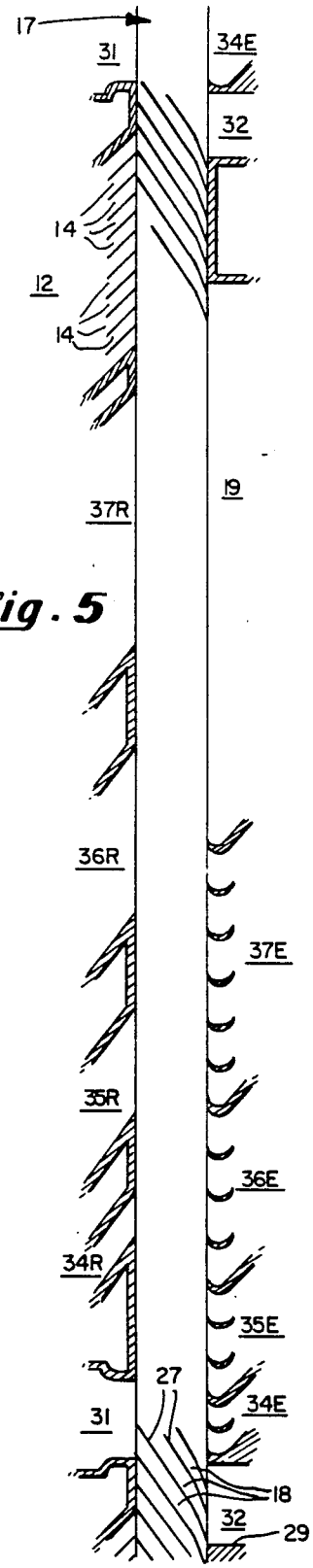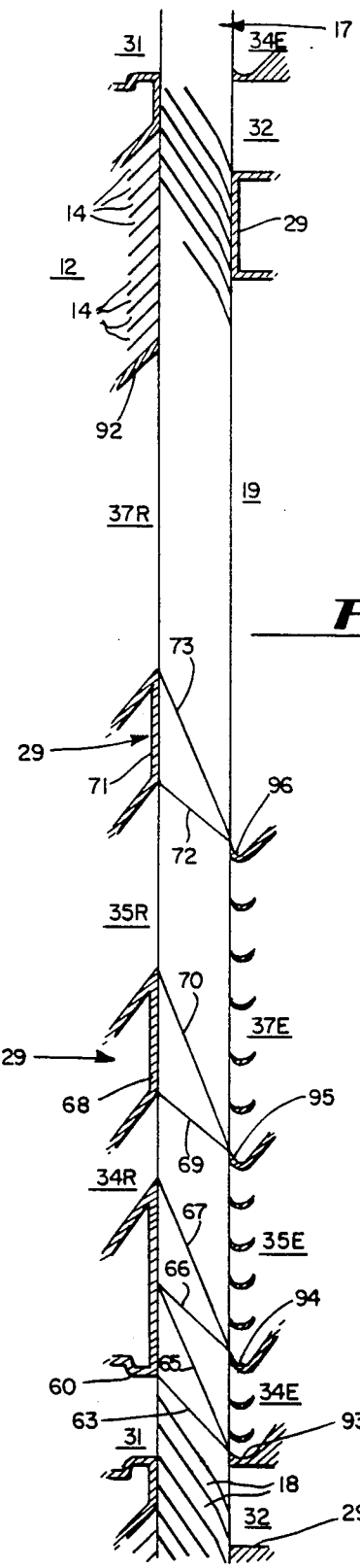

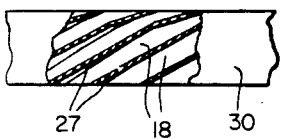
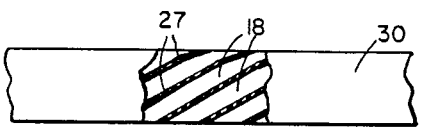
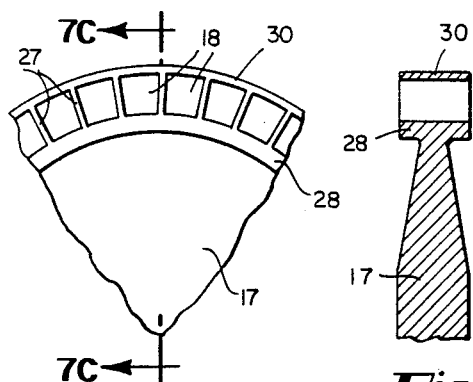
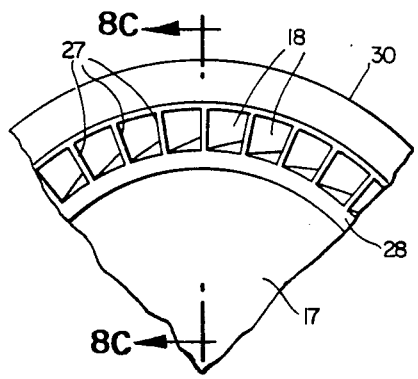
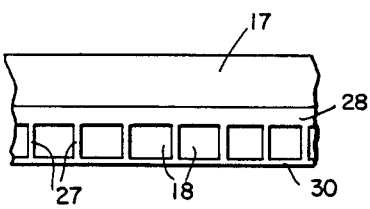
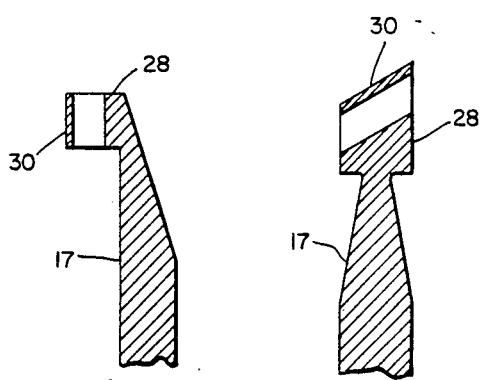
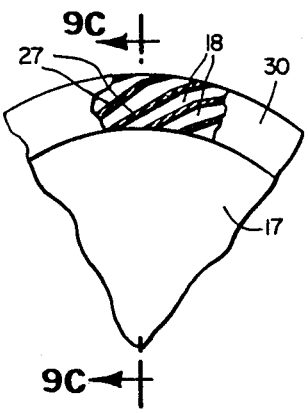
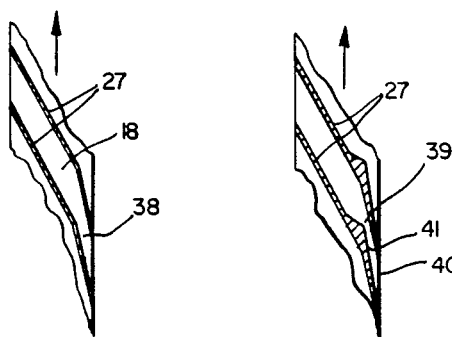
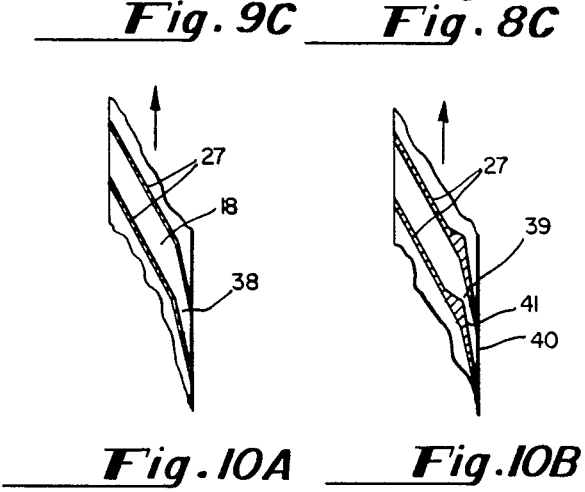

STAGED EXPANSION SYSTEM AS EMPLOYED WITH AN INTEGRAL TURBO-COMPRESSOR WAVE ENGINE

DESCRIPTION

The present application is a division application of U.S. application Ser. No. 191,410, filed Oct. 21, 1971, which was issued on May 21, 1974 as U.S. Pat. No. 3,811,796.

The present invention relates to a rotor-type heat engine, and more particularly to an engine with a compressor-expander rotor which utilizes direct and reflected shock waves to effect high compression of gases used with the engine. The present invention also provides a means for utilizing these high pressure gases to perform useful work; and all compression and expansion functions can be carried out on a single rotor.

BACKGROUND

It is difficult to make a direct comparison between the present engine and other engines, in order to give the reader some insight into the improvements, because it is our belief that no other engine works on the combination of direct and reflected shock waves. Certain pressure exchanger devices and supercharger devices employ a direct shock wave principle, such a device being the Brown Boveri "Comprex". However, pressures developed in these prior art devices fall considerably below the pressures developed in the present engine. In addition, the Comprex is not an engine in the sense that it does not do any useful work other than compression. In the Comprex, the hot gases are used to produce the final stage of compression, after which the hot gases are used to drive downstream turbines. Neither the Comprex nor its successors utilized rotor chamber nozzles in combination with reflected shock waves to achieve high compression.

SUMMARY

The present engine has a number of advantages over the prior art turbine type engines or devices, and it also has many advantages over the widely used internal combustion engine. Because of the configuration of the rotor chambers and the housing encasing the rotor, the present engine is able to develop a reflected shock wave during the compression phase. This reflected shock wave greatly increases the pressure of the gases within the rotor chambers and permits efficient operation at high rotor speeds. This high rotor speed makes possible further increases in operating pressures as compared with prior art devices. The very high pressures and temperatures developed in the rotor chamber gases of the present engine provide the basis for more torque and hence higher specific power from a turbine-type engine than has heretofore been realized. Further, the configuration of the rotor chambers, with the various nozzle embodiments, permits the compressor-expander rotor to do useful work in and of itself, while providing the flexibility of using the expanded gases therefrom to drive downstream turbines if that be desired. The present engine further provides means for reentry of these high pressure gases into the compressor-expander rotor chambers so that the available energy of these very high pressure gases can be more completely utilized by expansion and reaction through the rotor chamber nozzles before the working gases are exhausted (open cycle) or recirculated (closed cycle).

In open-cycle, fuel-burning versions of this engine, the combustion process, being external to the rotor, can be made so efficient that the exhaust contains virtually no carbon monoxide or unburned fuel. The external combustion process makes efficient use of simple fuels without undesirable additives such as lead compounds. Furthermore, the fuel may be of low volatility, thereby greatly reducing or eliminating environmental contamination resulting from evaporation of fuel during transfer, in storage, or in vehicle fuel tanks.

In addition the present engine, because of movable port control sections of the housing, operates efficiently at different speeds. Achieving efficient variable speed operation has been one of the major problems in the attempt to use turbine engines in such applications as automobiles and other mobile equipment.

The objects and features of the present invention will be better understood by considering the following description taken in conjunction with the drawings in which:

FIG. 5 is a linearized view of part of the structure of the present engine specifically set forth to depict a number of reentry paths used for the purpose of recharging the rotor chambers with hot gases, thereby providing additional reaction stages from the rotor chambers;

FIG. 6 is another linearized view of a portion of the engine shown for the purpose of depicting a number of reentry paths with associated rotor chamber reaction stages as well as the graphic display of some expansion waves developed therein;

FIGS. 7A, 7B, and 7C show three views of a section of the rotor wherein the rotor chambers are shaped helically;

FIGS. 8A, 8B, and 8C show three views of a section of the rotor wherein the rotor chambers are shaped helicoidally;

FIGS. 9A, 9B, and 9C show three views of a section of the rotor wherein the rotor chambers are shaped spirally;

FIGS. 10A and 10B depict illustrative alternative embodiments of the nozzle portions of the rotor chambers;

FIGS. 11A, 11B, 11C, 11D, 11E, and 11F depict illustrative arrangements of operating sectors of the present engine with respect to the axis of rotation.

DETAILED DESCRIPTION

Figure 1:
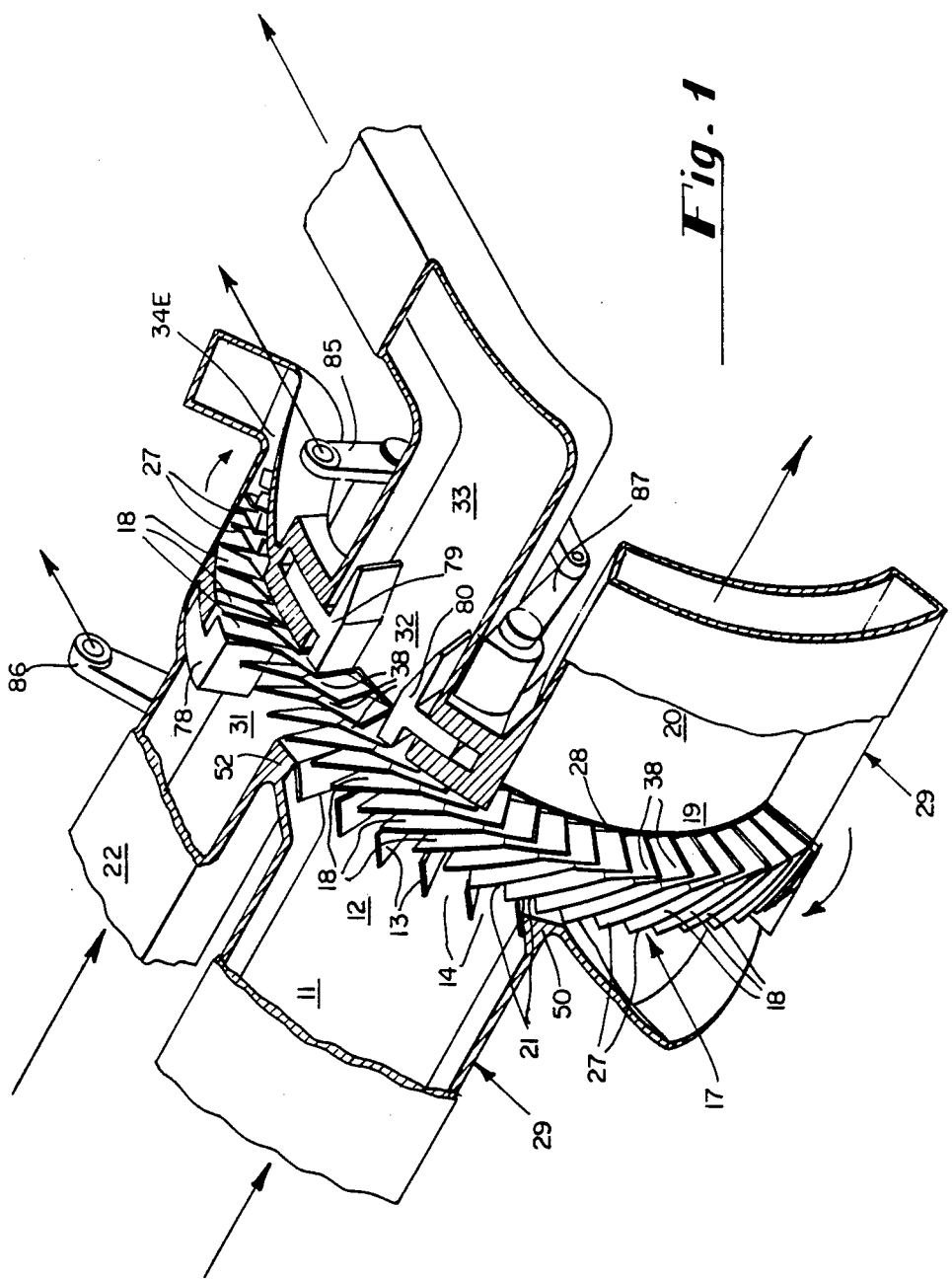
FIG. 1 is a pictorial view, partially sectionalized, showing a part of one embodiment of the present engine.
Figure 4:
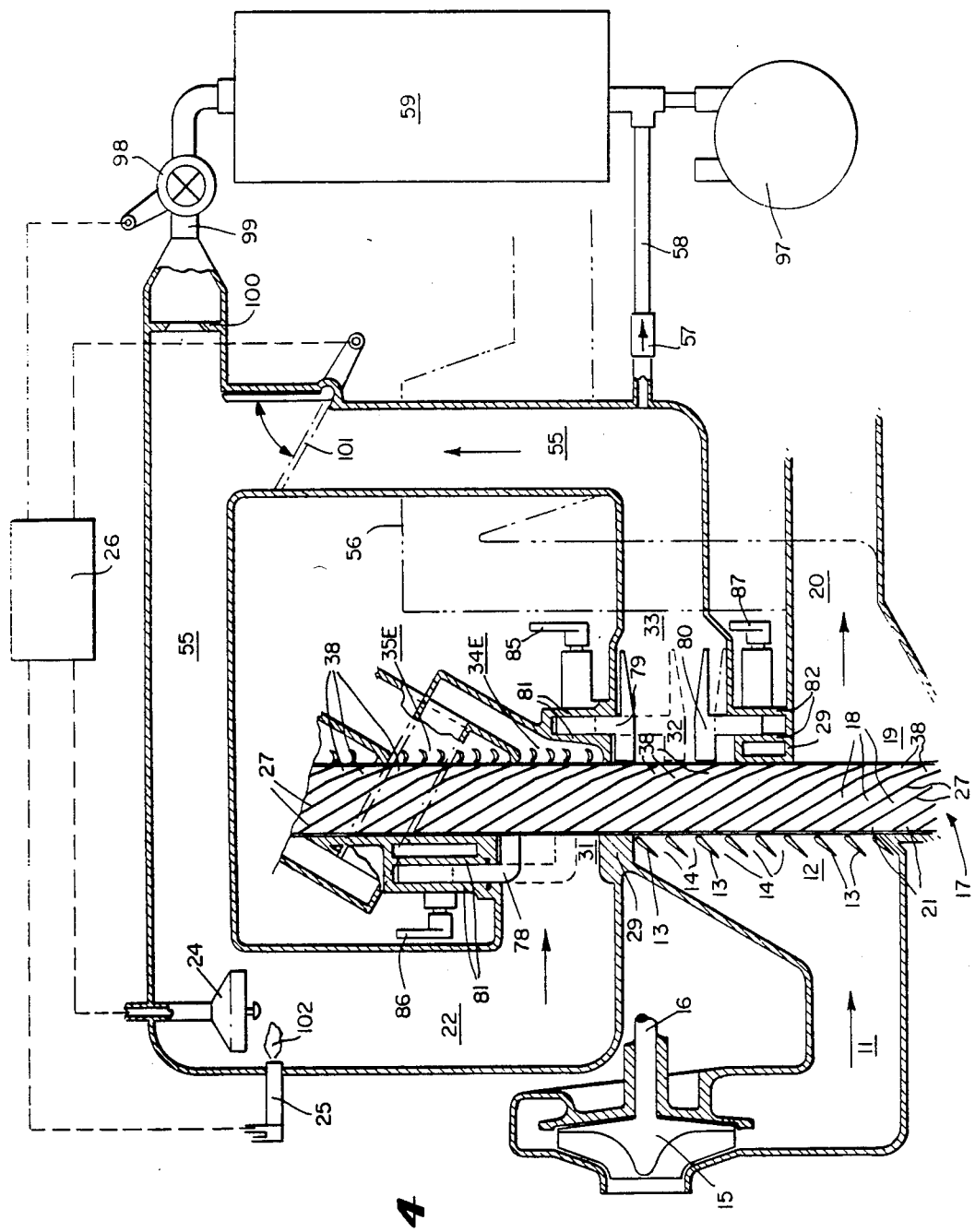
FIG. 4 is a linearized view of part of an alternative embodiment of the present engine, showing a more complete engine in diagramatic form; it also has movable blocks to permit controlled variation of the sizes and mean positions of selected inlet and outlet ports in the rotor housing.

Consider first FIGS. 1 and 4, and in particular FIG. 4, because more of the details of the system are depicted in FIG. 4. It will be noted that the present engine includes an intake chamber 11 which provides relatively low temperature, low pressure input gas through cool gas inlet port 12, subdivided by vanes 13 into port openings 14. Although various types and mixtures of input gases may be used, particularly in closed-cycle systems, it is anticipated that in open-cycle systems the low temperature, low pressure input gas will normally be air, taken from the surrounding atmosphere. The air will be supplied to the intake chamber 11 by the blower or compressor, 15. The blower 15 is driven by the shaft 16, by which it may in one embodiment be connected to the compressor-expander rotor 17 either directly or by gearing or other means. In alternate embodiments the blower may be driven through a variable speed drive (step-wise or continuously variable) or by an independent turbine wheel or by other similar means to allow control of the air (or other cool gas) supply independently of rotor speed. Blower 15 may be any kind of pumping device which draws in air from the atmosphere or which draws in cool recirculated gas in closed-cycle embodiments and fills the intake chamber 11. Guide vanes 13 are included to provide the proper amount of pre-rotation in the inflowing cool gases. These vanes may be fixed, in the case of constant speed applications, or variable, to permit appropriate pre-rotation angles over a range of operating in the case of variable speed applications.

In low temperature, low pressure input gas in the intake chamber 11 passes through port 12, with openings 14 formed by the pre-rotation vanes 13, to scavenge or flush out the spent gases from the rotor chambers 18 through exhaust port 19 into the exhaust chamber 20. This scavenging process occurs as each of the rotor chambers has its respective inlet opening, such as opening 21, exposed to the intake port 12 and its outlet exposed to exhaust port 19.

It will also be noted in FIGS. 1, 2, 3, and 4 that the present engine provides a heating chamber 22. The heating chamber 22 is shown in more detail in FIG. 4 with a fuel injector 24 located therein as well as a start-up ignition system 25. It should be understood that any of a number of forms of heat source may be used with this engine; for instance the gases in the heating chamber 22 may be heated by combustion, as will be principally described in connection with this specification, but the heat source for heating the working gases may also be a nuclear reactor, a radioactive heater, a solar heating device, or any of the numerous other means for heating gases in a chamber. In the present description it is to be understood that the fuel injector 24 is connected to the start-up control device 26 as well as to the source of fuel supply. For purposes of discussion we will consider that heating occurs as a result of combustion in air and that the fuel supply is an oil such as diesel fuel which is atomized or vaporized in the fuel injector 24 in a fashion similar to that of a conventional gas turbine combustor. The torch mechanism, or ignition mechanism 25, provides the pilot flame to the fuel coming from the fuel injector 24 and hence there is a burning of the fuel inside the heating chamber 22 which contains both the fuel injector 24 and the ignition device 25. The ignition device 25 is shown also to be controlled by the start up control 26. It should be understood that the ignition system may also optionally have an electric heater or other type of heater which pre-heats the fuel to facilitate combustion. A typical fuel control system which can be employed is the General Electric T-58 Engine Fuel Control System.

IN FIGS. 1 through 9 it will be noted that the rotor 17 has a plurality of blades 27 or other types of dividers or partitions which may have a number of configurations. As will be discussed later in connection with FIGS. 7(A–C), 8(A–C) and 9(A–C) these blades or dividers may be formed so that there is created an axial flow, a radial flow, or a mixed flow machine.

The cavities between the rotor blades or dividers are referred to hereinafter as rotor chambers. The rotor chambers as mentioned earlier are identified as chambers 18 in FIG. 1 through 10. Each rotor chamber 18 is bounded by two rotor blades 27 on two sides and by a rotor hub 28 on a third side. The rotor hub can best be seen in FIGS. 1, 7(A–C), 8(A–C) and 9(A–C) and forms the base of each rotor chamber. The hub 28 is cylindrical in shape for helically formed chambers, disc shaped for spirally formed chambers, and conically shaped for helicoidally formed chambers as shown in FIGS. 7(A–C), 8(A–C) and 9(A–C).

As can be determined from an examination of FIGS. 1–6, the compressor-expander rotor 17 is enclosed within a stationary housing generally identified as 29 whose walls lie adjacent to the paths of the inlet openings and the outlet openings of the rotor chambers. Each rotor chamber is bounded on the outside; i.e., on the side which lies opposite the rotor hub, by either another wall of the housing 29 or by a rotating shroud 30 affixed to the blades. This shroud is not shown in FIGS. 1, 2, 3, or 4, but can be seen in FIGS. 7(A–C), 8(A–C), and 9(A–C). For purposes of this description the openings in the stationary housing which connect the various stationary gas chambers with the rotor chambers will be identified as ports. The port 12, which connects the intake chamber 11 with the rotor chambers, has been previously described. It will also be noted in the various FIGS. 1–6 that there is a hot gas port 31 leading from the heating chamber 22, an exhaust port 19 leading to exhaust chamber 20, a cool compressed air port 32, leading to the cool compressed gas chamber 33, a plurality of high temperature gas expansion ports 34E, 35E, 36E and 37E, and a plurality of hot gas reentry ports 34R, 35R, 36R and 37R. It should be understood that the clearance between the rotor 17, including rotor blades 27 and shroud 30, and the stationary housing 29 is small enough on all sides to prevent any appreciable gas flow between adjacent rotor chambers, or from the rotor chambers radially inward past the hub 28, or from the rotor chambers radially outward past the shroud 30. Nevertheless, this clearance between the rotor 17, and the rotor housing 29 is sufficient to permit unrestricted rotation of the rotor at all operating temperatures. In FIGS. 5 and 6 the clearance between the rotor and the stationary housing is shown as a single line to indicate that the clearance is very close.

Each rotor chamber inlet 21 will in general have approximately the same cross sectional area as the main portion of the rotor chamber. The outlet of each rotor chamber is normally constricted to form a converging rotor chamber nozzle 38. Alternatively, as depicted in FIG. 10B each nozzle may take the shape of a constricted section 39 followed by an expanded section 40 to form a converging-diverging nozzle 41 which will be discussed hereinafter. The minimal cross sectional area of the rotor chamber nozzle is less than that of the main portion of the rotor chamber. The ratio of the cross-sectional area of the nozzle throat to that of the rotor chamber proper is chosen to be small enough to produce a reflected shock wave as already mentioned and as described in more detail hereinafter. The compressor-expander rotor 17 is disposed to rotate adjacent to the intake chamber 11, the heating chamber 22, the exhaust chamber 20, and the cool compressed gas chamber 33. The rotor chambers of the rotor accept cool gases from the intake chamber, acting initially as a scavenging gas, followed by hot gases from the heating chamber. It should be understood that the engine can be equipped with means to accomplish only one such cycle per revolution, utilizing all the rotor chambers about the periphery of the compressor-expander rotor in the course performing the one cycle. On the other hand, there may be means making up the engine which will accomplish a plurality of such cycles in one revolution. In those embodiments in which there is a plurality of operating cycles accomplished within one complete revolution of the rotor, the means for accomplishing each single cycle is defined by an arc configuration operating sector (see FIGS. 11A through 11F). Each such arc, within which one complete operating cycle occurs, is referred to hereinafter as a sector. The shock wave engine may thus have a single sector, or it may have a plurality of sectors arranged about the axis of the compressor-expander rotor as will be further discussed in connection with FIGS. 11A through 11F. In the case of a plurality of sectors, the various sectors may occupy either equal or unequal arcs about the periphery of the rotor, and they may be arranged symmetrically or asymmetrically about the axis.

OPERATION OF THE CYCLE

The steps that occur in one operating cycle; i.e., those that occur during the time that a rotor chamber of the compressor-expander rotor passes through one sector, are described herein at design point operation; i.e., at optimum speed for a certain fuel burning rate, hot gas temperature and external load. At other speeds or temperatures the arrival and departure of the shock waves, reflected shock waves and expansion waves may vary from the timing as described below. These conditions are termed "intermediate" operations. The resulting sequence of events, however, will be substantially the same, although flows, pressures, temperatures, and power may vary from those characteristic of design point operation. There is a multiplicity of shock waves (direct and reflected) and expansion waves that occur within the rotor chambers as consequences of port openings and closures during the compression process and during the subsequent hot gas expansion process. However, in the discussion which follows, only the most important shock waves and expansion waves which directly determine the operation and timing sequences of the inlet and outlet ports and the rotor chambers are described.

Figure 2:
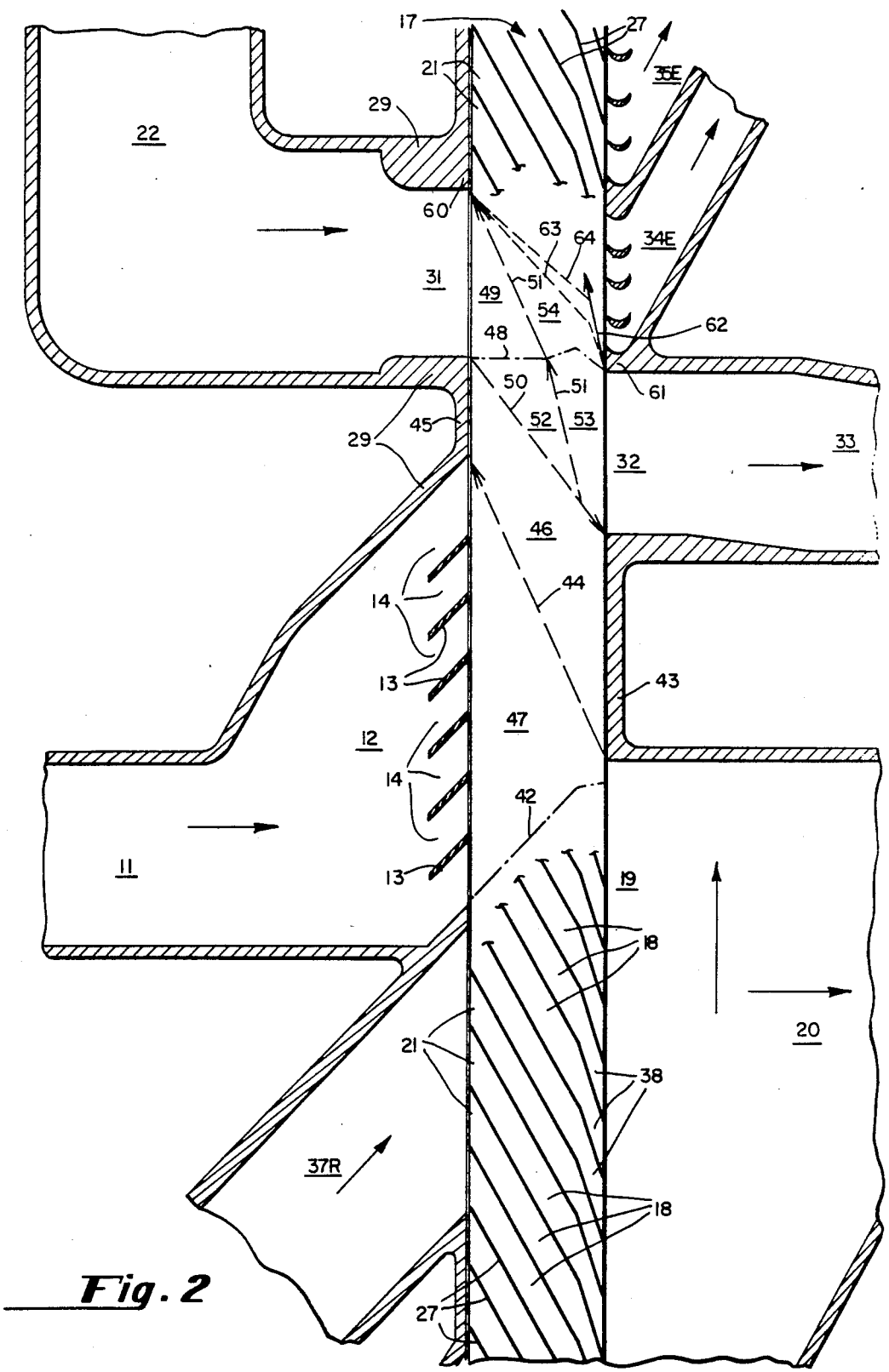
FIG. 2 is a linearized view of one sector of a simple embodiment of the engine having fixed ports, showing a reflected shock wave as it is developed, together with other shock waves and gas interfaces relevant to compression.

At design point operation, the sequence of events can best be understood by considering FIG. 2. It should be understood that FIG. 2 shows a structure which is simpler than those shown in FIGS. 3 and 4 in order to present more clearly the phenomena of the initial and reflected shock waves as well as an early expansion wave. For this reason the structure shown in FIG. 2 has no movable blocks in the inlet and outlet ports which are necessary to enable more efficient operation over a range of speeds. Nonetheless, for clarity, whenever possible the same identification numerals are used in FIG. 2 that are used in FIGS. 3 and 4.

Consider for the moment that there is hot gas flowing through the last passage 37R of the reentry system (the details of which will be considered hereinafter). The hot gas flows into the rotor chambers 18 and the expansion therefrom out of the nozzles 38 provides the last remaining thrust for the cycle. It should also be understood in this immediate portion of the description that the rotor chamber blades 27 actually are located around the entire rotor 17 but are left out of the drawing alongside the cold gas air intake port 12 and the hot gas port 31 in order to leave that area clear for the explanation of the initial and reflected shock wave phenomena. Except for wall friction effects, the progressive, non-instantaneous exposure of the inlets and outlets of each rotor chamber to the various inlet and outlet ports tends to make the gas interfaces, shock waves, reflected shock waves, and expansion waves within each rotor chamber parallel to the orientations shown in FIGS. 2 and 6.

Consider then that initially the rotor chambers 18 contain expanded or residual hot gas which remains from the end of the preceding operating cycle. As the compressor-expander rotor 17 rotates (or appears to move upward as considered in the linearized drawing of FIG. 2) the rotor chambers 18 have their inlet openings exposed to the intake chamber 11, through cool gas inlet port 12, and as a result the cool gas, air in this description, is passed into the rotor chambers 18. It will be recalled from the earlier discussion that the cool gas in chamber 11 is supplied by the blower 15; hence, it is at the same or slightly higher pressure than the residual hot gas remaining in the rotor chambers. The cool air enters the rotor chambers, initating a scavenging process, which drives the residual hot gases through the rotor chamber nozzles 38 and out through the exhaust port 19 into the exhaust chamber 20.

The interface between the cool gas entering from the intake chamber 11 and the residual hot gases in the rotor chambers 18 is shown by the dot-dash line 42 and will be referred to hereinafter as the cool gas/hot gas interface 42. It will be noted that the interface 42 has a change of orientation which commences at the entrance to the rotor chamber nozzles 38. The change of orientation of the cool gas/hot gas interface 42 at the nozzle entrance results from the greater velocity of the gases through the nozzles 38 as compared with their velocity through the main portion of rotor chamber 18. The interface 42 depicted in FIG. 2 shows the apparent stationary position of the interface from the standpoint of an observer on the rotor housing 29. Despite the apparent fixed position of the interface, the gases on both sides of the interface and the interface 42 itself are moving at high velocity through the rotor chambers and the rotor chamber nozzles. Despite the high velocities of these gases through the rotor chambers and the rotor chamber nozzles the interface 42 is made to appear stationary by the rotation of the rotor.

At the time when the interface 42 reaches the nozzle outlet, or shortly thereafter, the scavenging and intake portions of the operating cycle are complete and continued rotation of the compressor-expander rotor 17 causes the nozzle outlets to be closed by the wall 43 of the housing 29. The closure of the rotor nozzles causes the cool gas which entered from intake chamber 11 through inlet port 12 to be brought to rest. This stoppage initiates a shock wave 44 which is propagated upstream toward the rotor chamber inlet. The cool gas continues to flow from the intake chamber 11 into the rotor chambers while within each rotor chamber which has been sealed off by the wall 43 there is a shock wave approaching the rotor chamber inlet. When the shock wave 44 in a rotor chamber reaches the rotor chamber inlet, the timing of the rotation of the rotor 17 is such that the rotor chamber inlet is sealed by the wall 45. This closure prevents the reverse flow of the higher pressure cool gas 46 (compressed by the shock wave 44) back into the intake chamber 11 and also avoids having an undesirable expansion wave reflected into the rotor chamber. This well-timed closure maximizes the amount of cool gas trapped in the rotor chamber. At this point of the operation the cool gas in the rotor chamber is partially compressed and the pressure of the partially compressed cool gas 46 is higher than that of the intake gas 47 which is entering from intake chamber 11.

In the case of an open cycle engine of very simple design in which both the intake chamber and the exhaust ports are at atmospheric pressure, the scavenging and intake phases as summarized above could be made to occur as a result of the pumping effect of moving helical, spiral, or helicoidal chambers of a compressor-expander rotor. This pumping effect can be utilized with particular efficiency in conjunction with the converging-diverging nozzle embodiment (to be described hereinafter) where the diverging section of the nozzle acts as a sub-sonic diffuser during scavenging. In the more complex embodiments of the present invention, the pressure in the intake chamber 11 may be raised appreciably above that in the exhaust port by means of a mechanically driven blower 15, as mentioned earlier, or by a turbo-supercharger, by a ram or compression device, used in an aircraft or by combination of the foregoing, or by other suitable means.

Thus far we have considered the scavenging of the residual hot gases as well as the intake and partial compression of the cool gas; i.e., the intake air in the case of open-cycle embodiments. Upon completion of the scavenging and intake phase of the operating cycle, the continued rotation of the compressor-expander rotor 17 exposes the rotor chamber inlets to the heating chamber 22 through hot gas inlet port 31. This exposure creates an interface or boundary surface 48 between the high temperature, high pressure gas 49 from the heating chamber 22 and the relatively cool, partially compressed gas 46 trapped in the rotor chamber. As explained above in connection with interface 42, the interface 48 is shown as a dot-dask line that depicts a stationary spatial relationship in a plurality of rotor chambers. This is the position of interface 48 that would be observed if the interface could be marked and the viewer could be positioned above the housing with respect to FIG. 2. The interface 48 remains at the same position relative to the housing 29. This interface is actually moving rapidly through the rotor chambers; however, the orientation of the interface with respect to the housing is determined by the initial direction of the inflow of hot gases (axial in this case) through port 31, the ratio of pressures of the hot gas 49 and the partially-compressed gas 46, and the rotor chamber velocity.

Because of the initial pressure difference across this interface 48, corresponding under design point conditions to the velocity difference between the trapped partially compressed cool gas 46 in the rotor chambers and the high temperature gas 49 coming through the hot gas inlet port 31, a second shock wave 50 is generated which is propagated from the rotor chamber inlet through the partially compressed cool gas. This shock wave 50, moving faster than the hot gas/compressed cool gas interface 48, traverses the length of the rotor chamber, further raising the pressure of the partially compressed cool gas in the rotor chamber. The shock wave 50 is depicted in FIG. 2 as a spatial relationship as described above. The shock wave 50 is stationary with respect to the housing 29, but moving at high velocity with respect to the rotor chambers 18.

When the shock wave 50 reaches the constricted portion of the rotor chamber which forms the entrance to the rotor chamber converging nozzle 38 (or converging-diverging nozzle 41 in an alternate embodiment), there is generated a reflected shock wave 51. The strength of the reflected shock wave depends upon the reduced cross sectional area of the nozzle throat, as compared with the cross sectional area of the rotor chamber, the rotor speed, the hot gas temperature, and the rotor blade angle. The reflected shock wave 51 moves rapidly through the now compressed cool gas 52 and through the incoming hot gases 49 in the upstream direction toward the rotor chamber inlet. It should be understood, as was true in the descriptions of the other waves and interfaces, the reflected shock wave 51 is shown in a spatial relationship; i.e., stationary with respect to the rotor housing 29, although it is moving at high velocity through the rotor chambers 18. The rotor chamber velocity, when added to the velocity of the shock wave through the chamber, rotates the reflected shock wave vector to the position shown in FIG. 2 where it appears as a constant vector with respect to the rotor housing.

In the course of its passage through the rotor chamber, this reflected shock wave 51 further increases the pressure of the cool gases 53 and the hot gases 54 that lie behind the reflected shock wave. It will be noted that there is a change of orientation of the reflected shock wave 51 at the hot gas/cool compressed gas interface 48 due to the greater velocity of the reflected shock wave in the hot gas 49 as compared with the velocity of the reflected shock wave in the compressed cool gas 52. There is also a change in orientation in the hot gas/compressed cool gas interface 48 at its intersection with the reflected shock wave 51. This change in orientation is due to the reduced flow velocity of the compressed cool gas 53 and the hot gas 54 through the rotor chamber following the passage of the reflected shock wave 51. It will also be noted that there is another change of orientation of the hot gas/compressed cool gas interface 48 at the nozzle entrance due to the greater velocity of the gases through the nozzle 38 as compared with the velocity through the rotor chamber 18.

As a result of the effect of the shock waves 44 and 50, and the reflected shock wave 51, the pressure of the relatively cool gas 53 in the rotor chamber is raised to the maximum pressure attained in the operating cycle of the engine. The pressure of the hot gas 54 in the rotor chamber, which has also been subjected to the reflected shock wave 51, although raised considerably by the reflected shock wave, will be somewhat less than that of the cool gas 53 because of the decreased strength of this reflected shock wave 51 after it passes through the hot gas/compressed cool gas interface 48 and continues its movement toward the rotor chamber intake opening. However, at this point in the operating cycle, the pressure of the hot gas 54 behind the reflected shock wave 51 is raised to a level substantially higher than that of the hot gas 49 in the heating chamber 22, although it remains below the pressure of the compressed cool gas 53 in the rotor chamber.

At or near the time that the shock wave 50 reaches a nozzle 38 of a rotor chamber, continued rotation of the compressor-expander rotor 17 aligns each rotor chamber nozzle outlet with the compressed cool gas outlet port 32 which leads to cool compressed gas chamber 33 and thence (via duct 55 around the rotor) to the intake side of the heating chamber 22. This can be better appreciated by examining FIG. 4 where port 32, chamber 33, duct 55, and heating chamber 22 are all shown, illustrating the path of the compressed cool gas 53 from rotor chamber nozzle 38 to the intake side of the heating chamber 22. In one embodiment there is an optional heat exchanger 56 arranged to use the scavenged or residual hot gases to preheat the highly compressed cool gases passing through duct 55 before they enter the heating chamber 22.

As can be further appreciated in FIG. 4, the surplus, highly compressed cool gas 53 (or air), which is not required by the heating chamber 22 to support the operation of the present engine, may be fed through check valve 57 and pipe 58 to a high pressure storage tank 59 for use in connection with a compressed gas (or air) supply system, or diverted through suitable pipe and hose connections to be used immediately for conventional purposes such as supplying air driven tools and equipment, pneumatic starters, air turbines, automotive tires, pneumtic springs, pneumatic brakes, steering motors, air conditioners, etc.

One important aspect of the expansion and discharge of the high pressure cool gas 53 is the work done in this process. The expansion and discharge of the high pressure cool gas 53 from the rotor chambers 18 through the rotor chamber nozzles 38 is in a direction having a relative velocity component opposite to the direction of movement of the compressor-expander rotor 17. The discharge of the relatively cool, highly compressed gas 53 is an efficient work-producing expansion and over a wide range of rotor speeds makes a contribution to the positive torque generated, with effective use of the pressure produced by the reflected shock wave 51 in the cool gas 53. This contribution is possible because of the presence of the rotor chamber nozzles 38 which also cause the reflected shock wave 51 and control the flow of the high pressure cool gas 53 from the rotor chamber. This reaction effect is produced by the converging nozzles 38 or, as will be discussed hereinafter, by a converging-diverging nozzle 41, which acts to increase the velocity of the outflowing high pressure cool gas over its velocity in the rotor chamber.

Reconsider FIG. 2 and it can be determined that the rotor housing is further designed so that at or near the time the reflected shock wave 51 reaches the rotor chamber inlet, the inlet is sealed by the wall 60. The foregoing is true because the compressor-expander rotor 17 has continuous rotation and the rotation thereof, at design point operation, is such that as the reflected shock wave 51 reaches the inlet opening 21 of the rotor chamber (in which the phenomenon is taking place), that inlet opening will have been moved opposite, or adjacent, to the wall 60. Hence the rotor chamber inlet opening is sealed by the wall 60 of the housing, thus preventing a reduction in the pressure of the shock compressed hot gases in the rotor chamber. It should be noted that during the time interval that reflected shock wave 51 is traversing a rotor chamber 18, the hot gases 49 continue to flow through port 31 into rotor chamber 18, thereby maximizing the charge of hot gases fed into the rotor chamber. At or near the time that the hot gas/cool compressed gas interface 48 reaches the rotor chamber nozzle outlet this nozzle outlet is sealed by the wall 61, thereby initiating shock wave 62. This closure occurs because of the continued rotation of the compressor expander rotor 17. FIG. 2 also depicts an expansion wave (or fan) 63–64 bounded by the initial wave 63 and the final wave 64. There is a continuous drop in gas pressure across the expansion fan from wave 63 to wave 64. The expansion fan 63–64 is generated because the gases in the rotor chamber are moving at a certain velocity toward the rotor chamber nozzle and are suddenly brought to rest at the time that the rotor chamber inlet is sealed off. Shock wave 62 is generated in the same way that the initial shock wave 44 was generated; i.e., by having the gas flow out of the nozzle opening cut off, in this case by the wall 61. The shock wave 62 tends to offset or terminate expansion fan 63–64. The combined effect of both expansion fan 63–64 and shock wave 62 is to bring the gases in the rotor chamber temporarily to rest.

EXPANSION

While the expansion or blow down of the highly compressed cool gas 53 from the rotor has already been discussed above, the process of expansion or blow down of the highly compressed hot gases 54 is normally the most significant contributor to rotor torque and therefore to the work done by the engine. In this connection consider FIGS. 5 and 6. In FIGS. 5 and 6 the blades 27 have been excluded from the greater part of each drawing in order to simplify explanation. It should be understood that the compressor-expander rotor 17 in each of the drawings, FIG. 5 and FIG. 6, is fully equipped with blades 27 about its periphery even though such blades are only partially shown.

Consider FIG. 5 wherein there are shown four stages of reentry and expansion in one sector of the reflected shock wave engine. The expansion ports are identified with the letter "E" such as 34E and the reentry ports are identified with an "R" such as 34R. It should be understood that the expansion port 34E is connected around the outside of the rotor by a duct (not shown) to the reentry port 34R as shown in FIG. 5. Similarly each of the expansion ports is connected by a duct to a reentry port which is identified with a corresponding identification number. For instance, the expansion port 35E is connected to the reentry port 35R, the expansion port 36E is connected to the reentry port 36R while the expansion port 37E is connected to the reentry port 37R. For the purposes of orienting FIGS. 5 and 6 with respect to the other figures, it will be noted that the bottommost outlet port 32 is the same as the compressed cool gas outlet port 32 shown in FIGS. 1–4, although the dimensions are shown somewhat differently. Similarly the hot gas inlet port 31 in FIGS. 5 and 6 is the same as the hot gas inlet port 31 in FIGS. 1–4 although again the dimensions are somewhat different. It will be noted that there is a progressive increase in the sizes of expansion ports 34E, 35E, 36E and 37E.

The same is true of the corresponding reentry ports 34R, 35R, 36R and 37R. The progressive increase in the sizes of the ports in the upward direction (the direction of rotary motion) in FIGS. 5 and 6 is due to the need to accommodate a progressively larger fraction of the total hot gas flow as well as the expanded volume of the hot gas in each succeeding stage. The expansion ports shown are typical of those that can be used effectively for progressive expansion stages on a single rotor of this engine, providing torque and using reentry to recharge the rotor chambers, which then use the reaction of gases expanding through the rotor chamber nozzles to drive the rotor. Final expansion of the hot gas, and rotor reaction thereto, occurs with flow through the nozzle into the exhaust port 19. This stage is followed by a flow of scavenging cool gas which enters the rotor chambers through the intake port 12. Exposure of the rotor chamber inlet to the cool gas intake chamber 11 thorugh the cool gas intake port 12 with openings 14 initiates the next cycle of operations which follows the same steps as described above.

An alternate embodiment illustrating the expansion process is depicted with three typical stages of reentry as shown in FIG. 6. Again in FIG. 6, in order to have continuity between all the drawings, the typical compressed cool gas outlet port 32 and the hot gas inlet port 31 are repeated within the linearized view as shown before in FIG. 5. In FIG. 6, the dimensions and locations of the expansion ports 34E, 35E, and 37E as well as the reentry ports 34R, 35R and 37R are chosen so that at design point operation the timed arrivals of the principal expansion waves will contribute to the efficient flow of the expanding hot gas. Expansion port 36E and reentry port 36R are not present in FIG. 6 because only three reentry stages are included. As mentioned earlier, an expansion wave can be caused either by terminating an existing inflow at the source or by initiating an outflow to a region of lower pressure. The first type expansion wave brings the moving gas to rest starting at the point of inflow while the second type expansion wave initiates or accelerates the flow through an outlet. It should be noted that a shock wave is a single wave of pressure discontinuity, while an expansion wave is a region of continuously changing pressures. The zone convered by such an expansion wave is sometimes referred to as an expansion fan. No expansion fans are shown in FIG. 5. In FIG. 6 the fans are shown for simplicity as single lines, because each fan angle is very small.

In FIG. 6, the expansion fan 63–64 (described in connection with FIG. 2) is shown for simplicity as a single line 63. It will be recalled that this expansion wave was initiated by terminating the existing hot gas inflow through port 31 when the rotor chamber was sealed by the wall 60. Accordingly, expansion fan 63 is of the first type. It should also be understood that the expansion fans or waves shown in FIG. 6 are not shown with breaks at the nozzles because the drawing is reduced although these waves would have a break at the throat nozzles similar to that shown in FIG. 2. As can be seen in FIG. 2, when the rotor chamber nozzle is closed by the wall 61, a shock wave 62 is generated which tends to cancel the pressure reduction effect of expansion fan 63. The combined effect of the two is to bring the hot gases in the rotor chamber to a temporary halt. Immediately afterward the rotor chamber nozzle outlet is exposed to expansion port 34E, thereby initiating an expansion wave 65 (as shown in FIG. 6) of the second type. As a result there is an outflow of hot gases through the port 34E into a region of lower pressure. As can be seen in FIG. 6 expansion wave 65 travels upstream toward the wall 60 to a position somewhere between the hot gas entry port 31 and the first reentry port 34R. Since the hot gases have a velocity toward the rotor chamber nozzle, they will continue to flow toward the nozzle even after the expansion wave 65 reaches the wall 60 and produces a reflected expansion wave 66. However the gases that are bounded by the wall 60, the reflected expansion wave 66 and expansion wave 67 must come to rest with respect to the rotor chamber, whereas the gases that lie between reflected expansion wave 66 and the rotor chamber nozzle continue to flow out through the nozzle until reflected expansion wave 66 reaches the nozzle. As the rotor 17 continues to rotate, the rotor chamber nozzle outlets are exposed to expansion port 35E and hence another expansion wave 67 is generated. Expansion wave 67 traverses the rotor chamber and ideally arrives at the rotor chamber inlet coincident with the rotor chamber inlet exposure to reentry port 34R. The effect of expansion wave 67 is to drop the rotor chamber pressure to a lower level. The partially expanded hot gases ducted from the port 34E thus flow through the reentry port 34R and enter the rotor chambers exposed to port 34R.

The higher pressure (but partially expanded) hot gases from the reentry port 34R, as they enter into the rotor chambers, may, if there is a mismatch of pressure and velocity with the adjacent rotor chamber gases, cause a shock wave or expansion wave to propagate into the rotor chamber while the flow continues through the rotor chamber toward the second expansion port 35E. Meantime continued rotation of the rotor causes the rotor chamber inlet to be closed by the wall 68, thereby generating an expansion wave 69, resulting from the sudden stoppage of hot gas inflow. Expansion wave 69 traverses the rotor chamber and arrives at the rotor chamber nozzle outlet coincident with the rotor chamber nozzle becoming exposed to expansion port 37E. When the rotor chamber nozzle becomes exposed to expansion port 37E, a second type expansion wave 70 is generated and expansion wave 70 travels upstream through the rotor chamber as shown. Ideally at the time that expansion wave 70 arrives at the wall 68, the inlet of the rotor chamber is exposed to reentry port 35R which is carrying the twice expanded gas ducted from expansion port 35E. The effect of expansion wave 70 again reduces the rotor chamber pressure and enables the twice expanded hot gases flowing in from the reentry port 35R to enter the rotor chamber. These inflowing hot gases may also propagate a shock or expansion wave into the rotor chamber as described above for the preceding reentry stage. The hot gases flow through the rotor chambers into expansion port 37E. As a consequence of each expansion and outflow of the hot gases from the rotor chamber through the rotor chamber nozzles, the reaction produces torque on the rotor. The flow of the twice expanded hot gases into the rotor chambers for a third expansion into expansion port 37E continues. When the rotor 17 moves to a point where the rotor chamber inlet is sealed by wall 71, another first type expansion wave 72 is generated which traverses the rotor chamber toward the rotor chamber nozzle outlet. Expansion wave 72 arrives at the rotor chamber nozzle outlet at the time that the nozzle outlet is exposed to exhaust port 19. Exposure of the rotor chamber nozzle outlet to exhaust port 19 generates expansion wave 73 in a fashion similar to the generation of expansion waves 65, 67 and 70. Expansion wave 73 traverses the rotor chamber upstream and ideally arrives at the tip of the wall 71 coincident with the exposure of the rotor chamber inlet to reentry port 37R. Expansion wave 73 causes the gases in the rotor chamber to undergo another reduction so that the gases (which have already been expanded three times) from reentry port 37R enter the rotor chamber and continue to flow through the rotor chamber. In the course of the final stage of expansion and reaction, the hot gases flow through the rotor chamber nozzles into exhaust port 19. After final expansion of the hot gases into exhaust port 19 the cool gas from intake chamber 11 enters the rotor chamber through port 12 with openings 14, thereby initiating the next cycle of operations as previously described. Depending upon the dimensions of the rotor and the number of reentry ports provided, there may be shock waves interspersed with the expansion waves. This is due to the pressure of the reentering hot gases being different from the pressure of those hot gases already in the rotor chamber. It should be undestood that the reentered gases maintain the charge of the hot gases in the rotor chambers and provide additional torque by repeated reaction of said hot gases on the chamber nozzles at the different reentry exits, as well as from impulse of reentering flow of said hot gases on said rotor blades.

The expansion processes just described, using a number of stages of reentry, make efficient use of a single rotor to achieve all phases of operation of the integral turbo-compressor wave engine. In certain circumstances it may be necessary to limit the overall dimensions of the rotor. In such a case it may be deemed desirable to include only the initial expansion and/or only the first or the first few stages of reentry on the rotor. The remaining stages of expansion of the partially expanded hot gas, at this point at a reduced temperature, can be easily accomplished on a separate turbine wheel instead of accomplishing the repeated expansions through the rotor itself. Such a supplemental turbine wheel can be designed with the same type of blading as the compressor-expander rotor, to handle the reentry and expansion stages in the same manner as described above, or alternatively, the supplemental turbine wheel can be designed with conventional impulse or reaction blading. The separate turbine wheel may be either mechanically linked to the compressor-expander rotor by a shaft, gears, chain, belt, or other means, or it may be free running, subject to the effect of a separate control device. An example of the latter would be a turbo-supercharged for use at high altitude by turbo-prop or turbojet aircraft. Upon completion of the expansion by any of the means described hereinbefore, exposure of the rotor chamber inlet openings to the input cool gas chamber 11 through port 12 admits an inflow of cool gas for scavenging, thereby initiating the next cycle of operations. The repetition of the successive phases of the operating cycle, intake and scavenging (exhaust), compression, and expansion (power) may occur as a result of successive passes of the rotor chambers through the same sector, in the case of a single sector engine, or as a result of the passage of the rotor chambers through the corresponding phases of succeeding sectors, in the case of a multisector engine.

IMPORTANT FUNCTIONS OF THE ROTOR CHAMBER NOZZLES

The role played by the rotor chamber nozzles 38 and 41 in the present engine is of sufficient importance to warrant further discussion. The hot gases from the heating chamber 22 act as the source of energy which effects the rotor compression process described above. After initiation of the shock wave 50 (see FIG. 2) at the hot gas/cool gas interface 48, the hot gas 49 and the cool gas 52 have the same velocity and the same static pressure on each side of the interface. Therefore, the cool gas has a higher stagnation pressure than the hot gas by virtue of the higher density and higher Mach number of the cool gas as compared with the lower density and lower Mach number of the hot gas. At the high rotation speeds characteristic of this presently described engine, the velocity of both the hot gas and the cool gas in the rotor chambers is high. The higher the velocity of the hot gas and the cool gas, the greater the difference between the stagnation pressure of the cool gas and the stagnation pressure of the hot gas. Only a part of this stagnation pressure difference is needed to cause the flow of the cool gas back around the flow loop, including passage through regenerative heat exchanger 56 (FIG. 4) and through the heating chamber 22 which produces the hot gas. The remainder of this stagnation pressure difference may be utilized to increase the pressure of the hot gas in the rotor chamber, thereby elevating the engine pressure ratio. This is very effectively accomplished with the converging nozzles 38 (or converging-diverging nozzles 41 in an alternate embodiment) at the outlet side of the rotor chambers. These nozzles act as restrictions which generate a reflected shock wave 51 which propagates upstream through both the gas 52 and the hot gas 49 in the rotor chamber. The nozzles 38 (or 41) also accelerate the outflowing cool gas and direct the flow in large measure opposite to the direction of the rotor rotation, causing the rotor to do useful work over a wide range of speeds. Even at lower gas exit velocities, relative to the rotation of the rotor chamber, the nozzles accelerate the cool gases, thereby producing torque on the rotor. The nozzles also cause, through the reflected shock wave 51, a higher stagnation pressure in the hot gas 54 (i.e., after the shock wave has passed through the hot gas 49) than would occur without the reflected shock; i.e., if the cool gas were permitted to expand without the restriction provided by the nozzles. The higher pressure produced in the hot gases by the action of the reflected shock wave 51 results in a greater density of the hot gas. Thus a rotor of given size can handle a greater weight of gas flow and produce more power for a given speed than prior art devices. The rotor chamber nozzles also permit higher rotor chamber speeds because they provide means for directing the flow with a greater exit velocity and with a greater tangential component, thereby effectively utilizing the high pressure developed by the reflected shock wave 51 in both the cool gas 53 and the hot gas 54.

After entering the high pressure cool gas exit port 32 in the housing, the cool gas has a relatively low absolute velocity (relative to the housing) but a pressure still sufficiently high to generate a flow through chamber 33, through duct 55, through optional regenerative heat exchangers 56, and into the heating chamber 22. After conversion by the addition of heat from combustion, nuclear reactor, heat exchanger, or other source, the resulting hot gas 49 enters the rotor chambers 18 to complete the operating cycle as described above.

The rotor chamber nozzles (see FIGS. 10A and 10B) used in this reflected shock wave engine may be the converging nozzle 38 type or the converging-diverging nozzle 41 type. In each case the constricted nozzle throat 38A (converging nozzle) or 39 (converging-diverging nozzle) of either type of nozzle has a smaller cross-sectional area than that of the main section of the rotor chamber. However, the exit 40 of a converging-diverging nozzle may have a cross-sectional area smaller than, equal to, or greater than that of the rotor chamber. In the case of a converging-diverging nozzle, the choice of nozzle exit area to rotor chamber area ratio depends upon pressure ratios and the desired exit velocity for the hot gases, as well as diffuser characteristics desired in the diverging section during subsonic flows. The particular importance of a converging-diverging nozzle is that this type of nozzle permits efficient supersonic flow of high pressure cool and hot gases from the rotor chambers during some portions of expansion and blowdown, without seriously handicapping subsonic phases of the operating cycle. Subsonic flow of the gas normally will occur during scavenging (exhaust), but may also occur during discharge of the high pressure cool gas from the rotor chambers into the cool compressed air port 32 leading to the heating chamber 22. Subsonic flow may also occur during some stages of expansion and blowdown of the hot gases. The occurrence of supersonic versus subsonic flow in early, intermediate, or final expansion stages depends upon the design and operating conditions. Converging-diverging nozzles have the advantage of behaving as diffusers during the scavenging phase of the operating cycle, and reducing or even eliminating, in some embodiments, the requirement for pre-compression of the cool intake (scavenge) gas. Converging-diverging nozzles may be used with turning vanes or blades (not shown) in the exhaust port 19 to serve as diffusers to increase the static pressure of the exhaust gas, thereby providing sufficient pressure for expulsion of the exhaust gas to the atmosphere.

During the high pressure phase of the operating cycle, converging-diverging nozzles behave as accelerators and restrictors of flow of both the shock-compressed cool gas 53 (FIG. 2) and the shock-compressed hot gas 54 and generally perform the same function as the converging nozzles 38 discussed above. The disadvantage of the converging-diverging nozzle 41 is that there may be a small loss of stagnation pressure in each rotor nozzle during passage through some portion of each operating sector. This loss of stagnation pressure occurs in that part of the sector where pressure-temperature relationships are such that the converging-diverging nozzle does not function as a fully-expanded-flow supersonic nozzle and the pressure is not low enough for the diverging section of the nozzle to function completely as a subsonic diffuser. As a result a shock wave a created in the diverging part of the nozzle, because of failure to achieve complete expansion to supersonic speeds at the nozzle exit. The location within each operating sector at which this loss of stagnation pressure may occur will vary with rotor speed, hot gas temperature, and pressure ratio. The total effect of these parasitic shocks, which can occur in the diverging portion of the nozzle 41, on the overall operating efficiency of the engine can be held to a level so low as to be unimportant in most applications. At the lower pressure ratios associated with some expansion stages and scavenging, the diverging portion of the rotor chamber nozzle 41 acts as a diffuser, thereby permitting recovery of pressure as required for flow through optional regenerative heat exchangers and exhaust passages.

EFFICIENT OPERATION OVER A RANGE OF DIFFERENT SPEEDS

The following discussion illustrates the principle of port control as applied to the compression process over a range of different speeds and gas temperatures; however, the same principle is applicable to control of the location and the size of any of the inlet or outlet ports of the engine. The shock waves 44 and 50, reflected shock wave 51, the cool gas/hot gas interface 42, and the hot gas/cool gas interface 48 must move, as previously described with respect to FIG. 2. In other words, the shock waves should be ideally contained within the rotor chamber and the gas interfaces should move so as to avoid excessive outflow of cool low pressure gas 47 from the rotor chambers to exhaustport 19, in the case of interface 42, and so as to minimize the flow of hot gas 54 through the high pressure cool gas port 32 or to minimize the amount of the cool compressed gas carried into the first expansion 34E of the engine, in the case of interface 48. Thus the purpose of the port control arrangement, as illustrated for the compression process in FIG. 3 and FIG. 4, is to establish the proper spatial relationships among the leading and trailing edges of the appropriate ports (hot gas port 31 and cool gas port 32 in this case) so that the shock wave 50, reflected shock wave 51, the expansion fan 63–64, and the hot gas/cool gas interface 48 will move in such a way as to duplicate as closely as possible the configuration as shown in FIG. 2, regardless of rotor speed and the temperatures of the operating gases.

In the discussion which follows, the edge of any inlet or outlet port which is first exposed to a rotor chamber moving in the normal direction of rotation will be referred to as the leading edge of the port. Similarly that edge of any port which is last exposed to the rotor chamber moving in the normal direction of rotation will be referred to as the trailing edge of the port.

Figure 3:
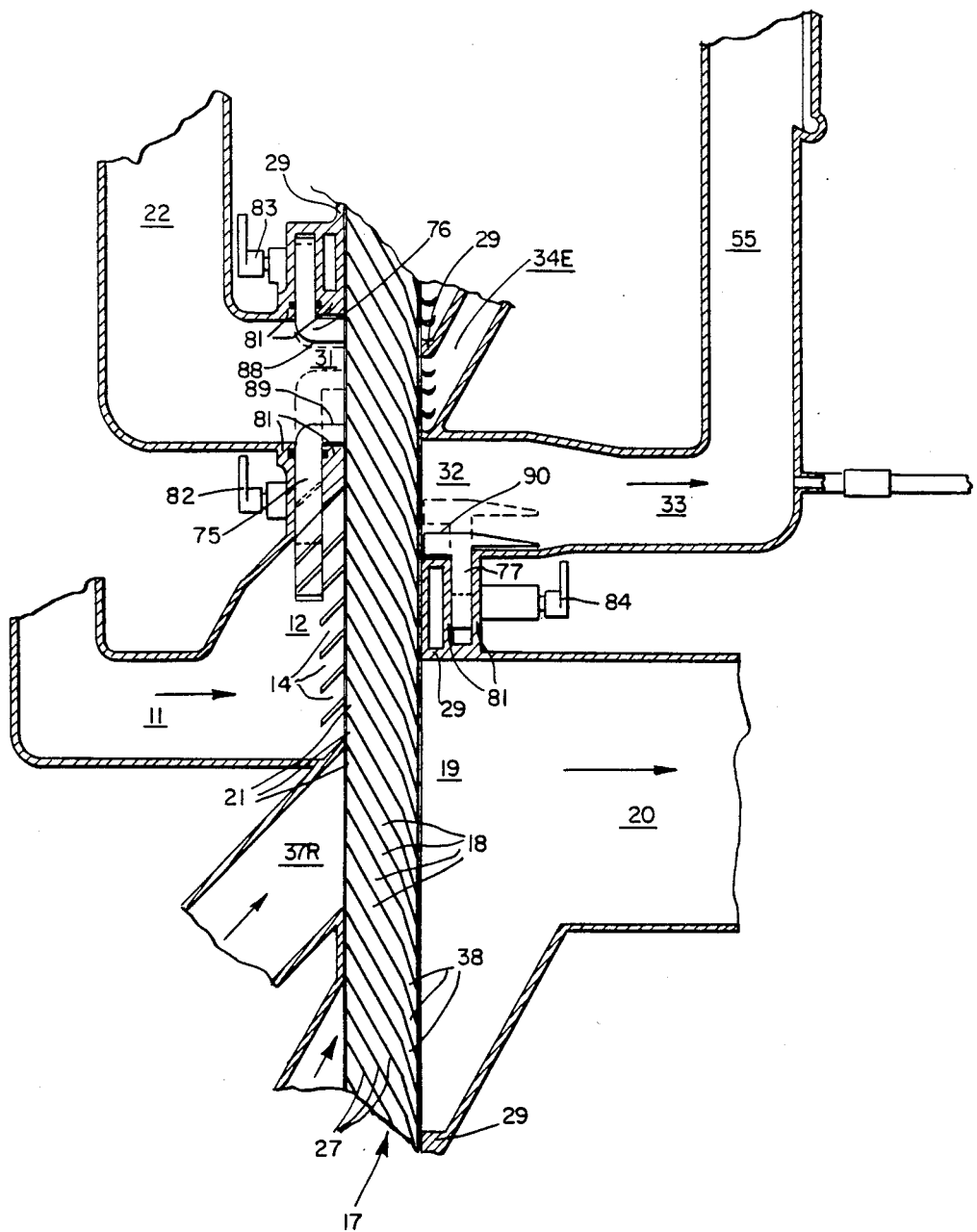
FIG. 3 is a linearized schematic view of a device similar to the one shown in FIG. 1 with more of the overall system depicted, and illustrating a preferred embodiment of movable blocks for controlling the sizes and mean positions of selected inlet ports and outlet ports in the rotor housing.

The present engine provides in its structure a means for achieving efficient operation at various speeds and for stable operation during the starting sequence through the use of movable port control blocks 75, 76, and 77 as shown in a preferred embodiment, FIG. 3, and similar movable blocks 78, 79 and 80 as shown in an alternative embodiment, FIG. 4. In both cases the control blocks accomplish the same purpose, but the embodiment of FIG. 3 is preferred because of practical design considerations. If the range of movement and the location of the control blocks in FIG. 3 and FIG. 4 are compared, several differences become apparent, some of which are important to note because they influence the preference for one embodiment over the others. For instance, the control block 78 at the trailing edge of hot gas port 31 in the case of the embodiment shown in FIG. 4 must have a greater excursion for a given range of speeds and temperature than does its counterpart, control block 76, of FIG. 3. This means that the guide channels formed by supports 81 in the embodiment of FIG. 3 can be shorter than the corresponding ones, guide supports 81, of the alternate embodiment in FIG. 4, with the advantage that these components, movable block and guide supports, located as they are in a high temperature portion of the engine, can be mechanically simpler, lighter, less subject to temperature effects and will project less into the expansion and reentry portion of the engine. The complete elimination in the embodiment of FIG. 3, of the control block at the trailing edge of cool compressed gas port 32 results in similar advantages, because once again this block would be subjected to the effects of the high temperature gas. The foregoing is true because the support mechanism must necessarily occupy some space between the cool gas port 32 and the first expansion port, and this arrangement would delay the beginning of hot gas expansion through port 34E with consequent increase in leakage from the rotor chamber prior to expansion.

The mechanical movement of these blocks acting together serves to modify both the sizes and the mean positions of the hot gas inlet port 31 and the high pressure cool gas outlet port 32. The direct result of the properly coordinated movement of these blocks is the balancing of the flow of the hot gases through port 31 from the hot gas chamber and the flow of cool compressed gases through port 32 into the chamber 33 and then into the duct 55. The movable blocks also make possible the proper positioning of the shock and/or expansion waves relative to the ports at any speed and any hot gas temperature within the operating range of the engine.

The positions of the blocks 75, 76, and 77 of the preferred embodiment of FIG. 3 are mechanically controlled by the cranks 82, 83, and 84, respectively, in conjunction with cams, racks and pinions, or other mechanisms not shown. In each of the embodiments as shown in FIG. 1, FIG. 3, and FIG. 4, the motion of the blocks is that of a circular arc.

It will be apparent to those skilled in the art that the positions of the edges of the various ports, for operations at different speed and gas temperatures, can be controlled alternatively by blocks which are constrained to move either circumferentially, axially or radially into and out of the various port openings. There may be either a single movable block associated with each edge or there may be a plurality of such blocks to perform stepwise adjustment of the position of the edge of the port. Any given block of this type may also have motion components in more than one direction, for example, combined circumferential, axial and radial movements.

It will be apparent that some form of automatic control is desirable in order to coordinate the movements of the blocks in the case of an engine to be used in a road vehicle, for example, because human responses would be too slow in making separate adjustments to optimize the port block settings for each of the many speed changes which are necessary when maneuvering a vehicle in traffic. The principal control input for the port blocks is the engine speed so that a servo system is required which establishes a fixed basic position for each block as a function of the engine speed. Such systems are called "followers" or position servos and are commonly applied in industrial control systems.

Deviations from the basic setting may be necessary in order to compensate for a broad range of temperatures of the hot high pressure gases. For example, it is conceivable that a form of the present engine could be used under conditions wherein a range of power output is desired at some specified speed setting or settings. The change in power output at some constant speed is obtained by either increasing or decreasing the temperature and the pressure of the hot high pressure gases 49 that enter the rotor 17 from the heating chamber 22. Again the vehicular engine is a good example of such a situation. The temperature compensation portion of the control system would in such cases further modify the position of the blocks 75, 76 and 77 as basically determined by the speed control in order to provide the maximum torque for a given hot gas temperature.

It has been determined that the proper positions of the blocks 75, 76 and 77 of FIG. 3 and in like fashion the proper positions of blocks 78, 79 and 80 of FIG. 4, bear an approximately linear relationship to each other as a function of engine speed; consequently, the cranks 82, 83 and 84 of FIG. 3, or similar cranks 85, 86 and 87 of FIG. 4 that move the blocks may in many cases be mechanically interconnected with each other so that the action of a single control element, such as a hydraulic or pneumatic cylinder (not shown), or an electric motor (not shown), can actuate all of the blocks upon command from the temperature compensated speed control.

There are applications, of course, where it may be feasible to permit manual adjustment of the control blocks either in some coordinated fashion or each separately in order to optimize the performance of the engine at a particular speed, thus dispensing with automatic controls.

The positions of the blocks 75, 76 and 77 of FIG. 3 are set so that for a specified rotor speed and a specified hot gas temperature the hot gas/cool gas interface 48 will reach the outlet of rotor chamber nozzle 38 at or near the instant that nozzle 38 comes opposite the trailing edge of cool gas port 32. This position of the movable blocks prevents the outflow of the hot gas through port 32 into chamber 33 and on into duct 55. At some combinations of rotor speed and hot gas temperature not all of the cool high pressure gas in the rotor flows from the rotor into the high pressure cool gas chamber 33, but is carried by the rotor into the expansion portion of the engine. The situation arises whenever the expansion fan 63–64, initiated by the closing of port 31 by the edge 88 of control block 76, crosses interface 48 before the latter reaches the cool gas port 32.

In the embodiment shown in FIG. 3 the edge 89 of control block 75 serves as the reference edge, thus edge 90 of block 77 forms the leading edge of cool gas port 32 and must be positioned so as to contain the cool gas, previously compressed by the shock wave 44, until the shock wave 50 has at least reached the upstream end of rotor chamber nozzle 38. Immediately afterward the nozzle exit must be exposed to the high pressure cool gas port 32 because the reflected shock wave 51 has now compressed the cool gas to the maximum pressure in the cycle compatible with highest overall engine efficiency. The compressed cool gas now expands through the rotor chamber nozzle, passes through port 32, and enters the cool gas chamber 33 and duct 55 through which it flows, ultimately reaching the heating chamber 22.

It is now apparent that the function of these illustrative control blocks is to adjust the loading and trailing edges of the ports 31 and 32 so that the timing of the shock wave 50, reflected shock wave 51, and the hot gas/cool gas interface 48 remains substantially the same as shown in FIG. 2 for all combinations of rotor speeds and hot gas temperatures so that the engine will operate at the greatest efficiency at all speeds and power settings. The proper positioning of the control blocks assures minimum mixing of the hot and cool gases either within the rotor chambers or in the cool compressed gas chamber 33. Thus the positioning of the blocks makes possible the most efficient operation of the engine throughout a wide range of speeds within which control of the shock wave 50, reflected shock wave 51, and hot gas/cool gas interface 48 can be maintained.

To achieve the maximum efficiency, regardless of mechanical complexity, similar movable blocks may be placed at the leading and trailing edges of all inlet and outlet ports. For example, such a movable block (not shown) at the trailing edge of exhaust port 19 or at the trailing edge of inlet port 12 (with openings 14), or at the trailing edges of both, can be used to adjust the relative position of shock wave 44 so as to avoid backflow into the intake chamber. A similar movable block at the leading edge of inlet port 12 (openings 14) will also provide flexibility in control of scavenging by permitting the cool gas/hot gas interface 42 to be initiated later or earlier in the engine cycle, thereby avoiding overscavenging (excess flow of cool gas into exhaust), and underscavenging (failure to expel all exhaust gas through exhaust port 19).

Similarly, in those embodiments in which the stator dimensions provide sufficient space for their inclusion, such movable blocks at the loading and trailing edges of hot gas expansion ports 34E, 35E, 36E, and 37E; reentry ports 34R, 35R, 36R and 37R; and at the leading and trailing edges of exhaust port 19 will permit selective control of hot gas flow during the expansion stages in order to optimize the expansion process over a wide range of rotor speeds and gas temperatures. The blocks in the reentry ports, expansion ports and ports 12 and 19 are not shown; however, the fabrication and role is so similar to the blocks shown in ports 31 and 32 that no further explanation is necessary and the drawings are usefully simplified without such blocks being shown.

In FIG. 3 and FIG. 4 two extreme positions of the control blocks are shown, the one in bold lines indicating the setting for the highest rotor speed and the one in dashed lines indicating the setting for the lowest speed and idling conditions. In these two embodiments utilizing circumferential movement of the blocks, the position of each block is continuously variable between these extreme positions. In FIG. 3 and FIG. 4 the positions defined are only approximate but do indicate the range of motion necessary with respect to the size of the hot gas port 31 and the cool gas port 32. During starting, the blocks 75, 76 and 77 of FIG. 3 (or the blocks 78, 79 and 80 of FIG. 4) will be in the low-speed position as defined by the dashed lines.

The edge 89 of block 75 in the preferred embodiment shown in FIG. 3 may be taken as the reference edge for starting the shock wave 50 and the interface 48, and correspondingly the fixed leading edge of port 31 in the alternate embodiment of FIG. 4 serves the same purpose. It should be apparent that in the compression process it is the relative position of the port blocks which is important, so that the choice of which, if any, of the four edges of ports 31 and 32 is to be fixed for any particular engine depends largely upon the mechanical design aspects of the engine.

The control block configuration as shown in FIG. 3 employs three blocks although one of these, block 76 at the trailing edge of port 31, moves a very small amount in comparison to the movement of the remaining blocks 75 and 77. Consequently, it would be possible to eliminate block 76 in an engine of simpler design but with some sacrifice of performance. In this case the trailing edge of port 31 could be taken as the reference edge for the positioning of the other control blocks.

It should not be inferred that a fixed reference port edge is necessary to the operation of the engine. It is conceivable that four control blocks could be employed in order to position both the leading and trailing edges of ports 31 and 32. In such a situation there is a reference position for each of the blocks at some predetermined speed and hot gas temperature which serves as a point of departure for all subsequent motions that are demanded by the control system while the engine is operating.

All previous discussion of the engine has been concerned with operation at some specific speed and power setting within efficient limits. In all cases it has been assumed that equilibrium conditions have been attained in the low pressure cool gas chamber 11, the heating chamber 22, and the high pressure cool gas chamber 33, as well as in the exhaust chamber 20. Once equilibrium is attained with respect to pressure and temperature of the gases in these chambers and the control blocks are properly positioned, the engine operates as previously described. However, there are transition states during periods of speed changes or power changes (or both simultaneously) in which the pressure and temperature of the gases in the chambers are not in a steady or equilibrium state.

If it is assumed that the engine is running at some equilibrium speed and power output and heat is suddenly added (e.g., fuel flow is increased), several momentarily unbalanced conditions arise: (1) the gas temperature in heating chamber 22 increases, and compression waves propagate upstream and downstream. As a result the pressure level in the recirculating flow loop including the heating chamber 22, port 31, cool compressed gas port 32 and chamber 33, and within the exposed rotor chambers is increased; (2) this pressure increase strengthens shock wave 50 and reflected shock wave 51 which compress the cool gas in the rotor chambers to a higher pressure and cause the hot gas/cool gas interface 48 to move faster; (3) the pressure of the hot gases 49 and 54 and cool gases 52 and 53 in exposed rotor chambers 18 of rotor 17 increases, the torque increases because of higher velocity outflow of gases through nozzles 33, and the rotor speed tends to increase until a new equilibrium condition is reached with respect to the heat supply and the engine load.

The conditions in the heating chamber, the cool gas chamber, and the exposed rotor chambers (3) the be described in analogous fashion for the situation in which the engine is running at some fixed speed and power output and there is a sudden decrease of heat input (e.g., reduction of fuel flow) to heating chamber 22. The momentarily unstable conditions which occur because of the reduced heat input lead to the following chain of events: (1) expansion waves in the heating chamber propagate upstream and downstream, thus decreasing the pressure of the recirculating flow loop, including the heating chamber 22, hot gas port 31, cool gas port 32 and cool gas chamber 33, duct 55, and exposed rotor chambers 18; (2) this pressure decrease results in a decrease in strength of shock wave 50 and reflected shock wave 51, a lowering of the pressure of both the hot gases 49 and 54 and the cool gases 52 and 53 in the rotor chambers, with consequent reduction of the speed of interface 48; the reduced pressure and temperature of the hot gases results in lower gas exit velocities and lower torque. Thus the rotor speed decreases until a new equilibrium is reached with respect to the heat supply and the engine load.

Now it should be understood that the present engine will operate as described in connection with FIG. 2, whether or not the movable blocks are properly set, but if they are not properly set the engine will simply not operate at its maximum efficiency. For instance if the rotor is slowed down because of load and the fuel input rate is not increased there is likely to be some hot compressed gas 54 exhausted through port 32 into chamber 33 which would be an inefficient operation. In a somewhat similar manner if the rotor were speeded up because of reduction of load and the fuel intake remained constant and the blocks were not reset, there is a liklihood that some cool compressed gases would get dumped into expansion port 34E which would be inefficient. Be that as it may, under either set of circumstances (or other combinations of temperature and fuel rate) above the engine will operate well on the compression and reaction principles described earlier. It should also be understood that the specific values of the engine parameters are not set forth because there can be as many sets of values as there are applications or uses of the present engine and the specific dimensions would vary accordingly. One set of values is set out herewith by way of example.

For a relatively small turbine engine which operates in the range of 217 ft/sec to 1050 ft/sec with a design point of 866 ft/sec the speed being measured along the pitch line of the rotor blades 27, the following dimensions, considering FIG. 6, can be employed:

| | | |
|---|---|---|
| Rotor diameter across mean height of blades | — | 14.00 inches |
| Blade heights and port heights | — | 1.00 inches |
| Cross sectional area of rotor chamber | — | .30 square inches |
| Cross sectional area of nozzle | — | .15 square inches |
| Port 12 (pitch line length) | — | 4.32 inches |
| Port 31 (pitch line length) | — | 1.80 inches (minimum opening .55 inches) |
| Wall 60 (pitch line length) | — | 2.24 inches |
| Port 34R (pitch line length) | — | .66 inches |
| Wall 68 (pitch line length) | — | 1.39 inches |
| Port 35R (pitch line length) | — | 1.56 inches |
| Wall 71 (pitch line length) | — | 1.99 inches |
| Port 37R (pitch line length) | — | 2.76 inches |
| Wall 92 (pitch line length) | — | 1.10 inches |
| Port 32 (pitch line length) | — | 1.32 inches (minimum opening .40 inches) |
| Wall 93 (pitch line length) | — | .25 inches |
| Port 34E (pitch line length) | — | .66 inches |
| Wall 94 (pitch line length) | — | .19 inches |
| Port 35E (pitch line length) | — | 1.56 inches |
| Wall 95 (pitch line length) | — | .19 inches |
| Port 37E (pitch line length) | — | 2.76 inches |
| Wall 96 (pitch line length) | — | .19 inches |
| Port 19 (pitch line length) | — | 7.56 inches |
| Entrance angle of blades (rotor chamber) measured from plane of rotation | — | 40 degrees |
| Exit angle of blades (convergent nozzles) measured from plane of rotation | — | 20 degrees |

STARTING OF THE SHOCK WAVE ENGINE

One of the most important reasons for adding optional movable blocks at the leading and trailing edges of inlet ports 12, 31, 34R, 35R, 36R and 37R, as well as the leading and trailing edges of outlet ports 19, 32, 34E, 35E, 36E, and 37E is to facilitate starting the presently described engine at a very low speed, substantially below the design point speed. For example, to start the shock wave engine the illustrative movable blocks, 75, 76, and 77 (FIG. 3) and 78, 79, and 80 (FIG. 4) should be set in the positions suitable for low speed operation as described above and as represented graphically by dashed lines. The integral starter for this type of system uses energy from a storage tank 59 (see FIG. 4) which contains the high pressure cool gas which has been previously extracted from the cool gas duct 55 via check valve 57 and pipe 58, with perhaps some additional compression by auxiliary compressor 97. For an open cycle system, with a combustion type heating chamber, or other open cycle systems with a non-combustion heat source, the storage tank would normally contain compressed air. For closed cycle systems with non-combustion heat sources, the storage tank would contain a supply of the normal circulating gas as used in the operation of the engine. In the present embodiment the compressed cool gas in the storage tank 59 is released by the start valve 98 to flow through the duct 99 to the pressure regulator 100 which releases the cool gas at a constant pressure for a short interval of time sufficient to start the engine. An orifice may be used for pressure regulation since, for the greater part of the starting cycle, the pressure ratio across the orifice chokes the flow in such a way as to accomplish adequate pressure regulation. The pressure regulated flow of cool gas from the tank 59 proceeds via the duct 55 to the region between the ignition device 25 and the fuel input device 24. The flow of starting gas is forced in the normal direction by the check valve 101, which is actuated to the blocking position, shown by dotted lines in FIG. 4, by action of controller 26. While it is not shown, it will be assumed that there is a supply of fuel provided in accordance with the controller 26 which is injected under pressure through the fuel injector 24. The ignition flame 102 is propagated into the heating chamber in the neighborhood of the operating fuel injector 24. The operating fuel is forcefully injected under pressure sufficient to cause formation of a spray of small droplets.

When the ignition flame 102 has spread to the injected fuel from the fuel injector 24, mixed with the compressed air from storage tank 59, there will be created by continuous combustion a substantial quantity of high temperature, high pressure gas in the heating chamber 22. In the case of a non-combustion heat source, no igniter is required and the compressed gas flows directly to the heat source of the heating chamber 22 thereby creating a substantial quantity of high temperature high pressure gas. The high temperature high pressure gas from the heating chamber 22 flows through the hot gas port 31 where it impinges upon the rotor blades 27 to initiate rotation of rotor 17. Rotation of the rotor 17 and corresponding action of the blower 15 causes the cool gas 47 to be brought in through the intake chamber 11, through the cool gas port 12, and then into the rotor chambers 18, thereby sweeping out any residual exhaust gas from the previous operations. The rotation of the rotor 17 causes the closure of the nozzle exits 38 (or 40) bringing the incoming cool gas to rest, thereby initiating the shock wave 44 (initially weak but gathering strength during start up procedure) described earlier in connection with the discussion of FIG. 2. Continued rotation of the rotor exposes the cool gas in the rotor chambers to the high temperature gases 49 from the heating chamber, thereby creating the hot gas/cool gas interface 48 (see FIG. 2). The shock wave 50 is also initiated as described earlier and this further compresses the cool gas 52. The rotor speed increases due to the effect of the flow of hot gas 49 impinging on the rotor blades 27 and the reaction to the gas outlfow through the nozzles 38 and through the cool compressed gas port 32 into chamber 33. Simultaneously the reflected shock wave 51 is generated, further increasing the pressure of the shock compressed cool gas 53 which rapidly reaches a higher pressure than that of the gases in the heating chamber 22. These cool compressed gases exit through port 32, travel through the chamber 33 and duct 55 (see FIG. 4) and impinge on the check valve 101. When the pressure of the compressed cool gas is high enough, the swing type valve 101 moves from its closed starting position (shown by dotted lines) to its open operating position (shown by solid lines), which allows free flow of the cool compressed gas 53 from the cool compressed gas outlet port 32, through chamber 33 and through the duct 55 back into the heating chamber 22. The use of the swing type check valve 101 is only illustrative, as there are many other means of back flow control well known to those skilled in the art. When the swing type check valve opens to permit normal flow of shock compressed cool gas 53 into the heating chamber 22, the starting sequence has been completed and the rotor 17 will proceed to increase its speed, although because of the low speed the engine may not be operating at very high efficiency at this time. As the rotor increases its speed, the illustrative movable blocks 75, 76, 77 (FIG. 3) or movable blocks 78, 79, and 80 (FIG. 4) are repositioned, thereby opening the ports 31 and 32 wider. If it is the intention to get the speed of the engine up to the design point or optimal speed, then these movable blocks will be moved into the positions shown by the solid line in FIG. 4. Hence, the engine is started with the compressed air (or other gas) which has been previously stored in the tank 59 and then heated for starting by passing it through the heating chamber 22. Obviously during the start up procedure the efficiency of the engine is low, but improves, reaching maximum efficiency for the proper settings of the movable blocks in the port openings.

A second sequence of events occurs to replenish the supply of compressed cool gas in the tank 59. For compactness the storage tank will normally contain gas at a pressure above the maximum operating pressure of the reflected shock wave engine. However, in the course of starting, the pressure of the stored compressed gas in the tank 59 may drop below the pressure of the operating compressed cool gas 53. Check valve 57 prevents the flow of the stored gas in the tank 59 into the duct 55. However, when the pressure in the duct 55 exceeds that of the storage tank the check valve 57 will open to permit a limited flow of compressed cool gas 53 into the storage tank 59 in order to replenish the supply of compressed gas which has been used in the start up operation. When the pressures of the gases in the duct 55, and the storage tank 59 are equal, the check valve 57 will close. If it is desired to store additional gas at higher pressure than that in the cool gas chamber 33 for future starting, an auxiliary compressor 97 may be used. The auxiliary compressor 97 is also provided for use when it is necessary to recharge the storage tank 59 at a time when the present engine is not operating.

It should be noted in FIG. 4 that there are vanes 13, optionally rotatable. These pre-rotation vanes in the inlet port 12 provide the flexibility of entry angle of cool gas 47 from chamber 11 required for the most efficient operation at all speeds, including idling and starting. If the vanes are properly positioned, the cool air which enters the rotor chambers does so at an angle which is compatible with the speed of the rotor and relative velocity of the exhaust gases in the rotor chamber. If the vanes are positioned as shown in FIG. 4, the entering gases have a component in the direction that the rotor is traveling, indicating that the relative velocity of the gas in the rotor chamber is somewhat less than the rotor speed. The amount of pre-rotation of the gases entering from chamber 11 is ideally such as to produce a relative velocity in the rotor chambers which just matches that of the hot gases in the rotor, in which case there will be no shock waves or expansion fans initiated at the gas interface 42.

Although not illustrated, the engine can also be started by direct cranking (or rotation) of the rotor by some mechanical means, such as an electric motor, provided that the blading arrangement of the rotor is such as to produce circulation of the gas through the loop consisting of hot gas chamber 22, the rotor 17, the cool gas chamber 33, and duct 55. This circulation must be in the same direction, of course, as the normal operating flow. Such a circulation of the gas can be obtained only if the gas, upon leaving the rotor by way of the nozzles 38, has a greater tangential component of velocity in the direction of rotation than it had when it entered the rotor from the hot gas chamber 22. Unless this condition is established, the rotor cannot perform positive work upon the circulating gas, and thus no pressure increase in the cool gas chamber 32 over that in the hot gas chamber 22 is possible.

The helical type rotor with axial flow, such as illustrated by FIG. 1, FIG. 2, FIG. 3, and FIG. 4, cannot produce the conditions necessary to promote circulation in the aforementioned gas loop; so that it is not possible to start an engine with this type of rotor by direct mechanical cranking, whereas an engine having a spiral or helicoidal type rotor with radial flow or a significant radial flow component in the rotor can be started by this means, provided that the tangential gas velocity at exit from the rotor is greater than an inlet. Thus the helicoidal rotor of FIG. 8 and the spiral rotor of FIG. 9, using a radial outward flow, could be used as components in an engine to be started by mechanical cranking.

It will be apparent to anyone skilled in the art of designing turbomachines that there are geometric restrictions upon the cross-sectional area ratio of the rotor nozzle passage 38 (or throat 39) to the rotor chamber inlet in order to yield proper rotor reaction for stable circulation. This subject is treated at length in the technical literature which deals with the design of turbomachines.

In a mechanically cranked start procedure, once the circulation of the gas has been stabilized, the gas can be heated in chamber 22, by injection and burning of fuel or by other means in the case of an engine with appropriate spiral or helicoidal rotor but with other features similar to those illustrated in FIG. 4. At this point the hot gases will provide the additional energy necessary to accelerate the rotor to the stable running speed and mechanical cranking can be discontinued, because the engine rotor will now produce sufficient torque (or power) to sustain operation.

In both of the illustrative embodiments described above (FIGS. 3 and 4), the intermediate positions of the movable blocks and vanes can be used to achieve maximum efficiency at intermediate speeds. For automatic adjustment of the movable blocks and the pre-rotation vanes, there may be provided hydraulic, pneumatic, electrical or other means which can position the movable blocks either directly or through a mechanical linkage illustrated by crank, shaft and cam devices 82, 83, and 84 in FIG. 3, or 85, 86 and 87 in FIGS. 1 and 4. The linkages in the automatic controls if these blocks are not shown because any number of approaches familiar to those skilled in the art can be used to automatically move the crank, shaft, and cam devices; thus the automatic movement means therefor are not considered part of this invention. However, the movable blocks themselves and the results attained thereby are considered part of the invention.

It may be desirable to avoid the overscavenging which may occur at low speeds with the consequent wasted work of pumping surplus cool intake gas into the rotor chambers, through the rotor chamber nozzles 38 and out through the exhaust port 19. If the cool gas blower 15 is driven mechanically by the rotor 17 or by other means at a speed proportional to that of the rotor, the speed of the cool intake gas 47 through the intake chamber 11, through the rotor chambers 18, and through the rotor chamber nozzles 38 (or 41) will be approximately proportional to the rotor speed. The speed of the residual hot gas being expelled into the exhaust chamber 20 by the advancing cool gas from the intake chamber 11 will also be approximately proportional to the speed of the rotor. Therefore, in this simple embodiment, with the blower speed proportional to the rotor speed, the leading and trailing edges of the exhaust port 19 can be fixed (i.e., non-adjustable) without significant loss of operating efficiency at various speeds. However, in the case of those types of supercharged embodiments in which the blower speed is not always proportional to the rotor speed, it will be necessary in preferred versions to provide an adjustable trailing edge in the exhaust port 19 by means of a movable block similar to those previously described. For any given engine (rotor) speed this movable block would be advanced for higher blower speed settings and retarded for low blower speed settings.

Consider now FIGS. 7(A–C), 8(A–C), and 9(A–C) which show a number of configurations for the geometric shapes of the rotor blades and the geometric shapes of the rotor chambers formed between these blades. In FIGS. 7(A–C), the blades are shown helically shaped to permit axial flow of the working gas. The blade configurations of FIGS. 1–6 are of this kind. In FIGS. 8(A–C) the blades, and hence the rotor chambers, are shown helicoidally shaped to permit a flow with both axial and radial components. The radial component may be inward or outward, depending upon choice of design and resulting direction of flow. FIGS. 9(A–C) show the blades, and hence the rotor chambers, spirally shaped to permit radial flow directly toward the axis of rotation or directly away from the axis of rotation, depending upon the choice of design and resulting direction of flow. These are illustrative alternative rotor embodiments selected to show the applicability of the principles described herein to different geometric forms.

Figure 11A:
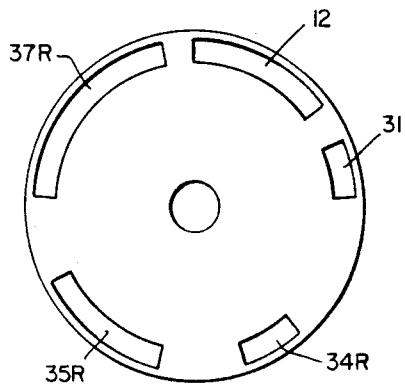
Figure 11B:
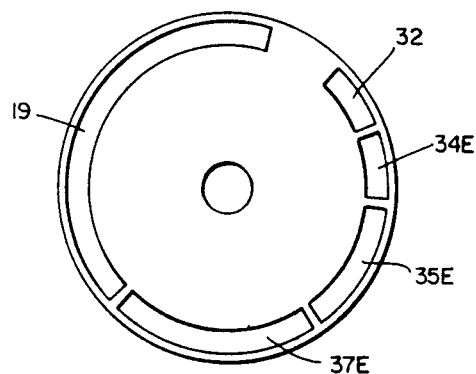
Figure 11C:
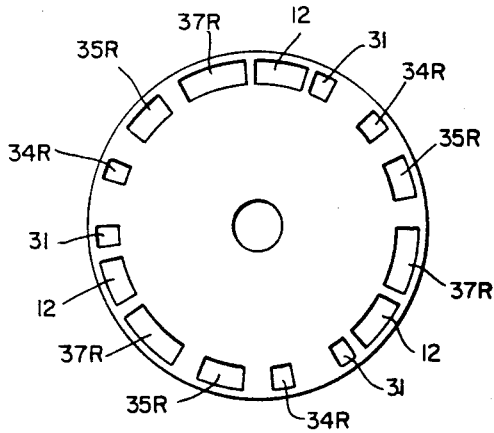
Figure 11D:
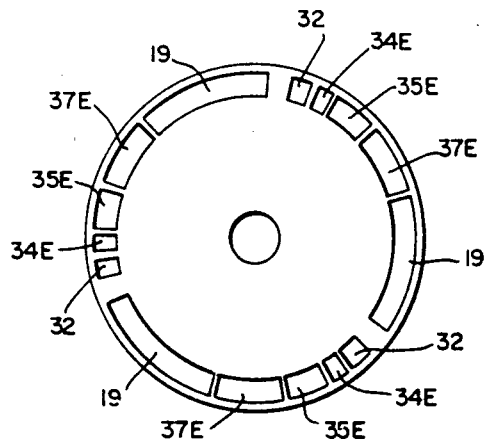
Figure 11E:
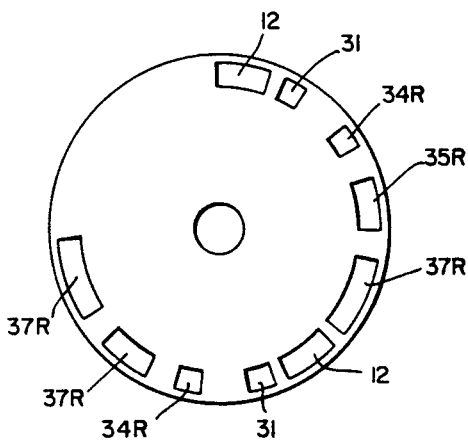
Figure 11F:
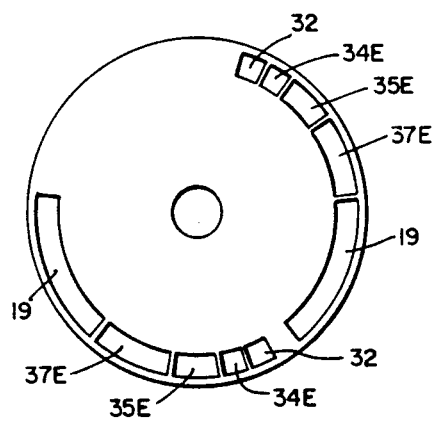

Finally, consider FIGS. 11A through 11 F. FIGS. 11A, 11C and 11E show the inlet ports for various type engine arrangements and FIGS. 11B, 11D and 11F are the counterpart outlet port arrangements for the inlet port arrangements shown respectively in FIGS. 11A, 11C and 11E. The inlet and outlet ports shown in FIGS. 11A and 11B are for a single sector engine as described earlier using three stages of reentry. The numbered features shown in FIGS. 11A and 11B are the same as those that were shown for instance in FIGS. 1–6. The port arrangements shown in FIGS. 11C and 11D are for an engine which has three sectors per revolution and which uses three reentry channels per sector. The same number identifications are used, and it should be clear what the port arrangement is after a study of the number identifications. It will be noted that in FIGS. 11C and 11D the arrangement of the three operating sectors is symmetrical so that there is an even distribution of operations about the axis of rotation. However, the arrangements shown in FIGS. 11A and 11B (single sector) and FIGS. 11E and 11F are for asymmetrical devices. Symmetry of sector arrangement about the axis of rotation is feasible for any embodiment having two or more sectors. However, deliberate choice of an asymmetrical arrangement of the sectors (one or more) of an engine may be used to offset in whole or in part the asymmetric forces on the engine shaft resulting from external mechanical drive connections such as gears, chains, discs, or belts. The identification numerals for corresponding features in FIGS. 11E and 11F are the same as previous FIGURES and the arrangement thereof should be apparent.

DISTINCTIVE OPERATIONAL FEATURES

The operation of the rotor of this integral turbo compressor wave engine described above differs markedly from that of a conventional turbine in that each rotor chamber 18 of this engine performs a succession of complex functions some of which (except combustion) are roughly analogous to those of a piston-type internal combustion engine. By contrast the interblade cavities of a conventional turbine perform a simple steady-state control of the flow and expansion of the working gas. The present engine differs markedly from piston-type internal combustion engines in that it has no reciprocating parts, no valves, and no intermittent ignition or fuel injection devices. Instead counterpart functions of these complex devices are achieved as a consequence of timed shutter-like exposure of rotor chambers 18 to inlet ports 12, 31, 34R, 35R, 36R, 37R and to outlet ports 19, 32, 34E, 35E, 36E and 37E. These functions are accomplished as a consequence of rotary movement of the rotor 17, with the generation of shock waves 44, 50 and reflected shock wave 51, expansion waves, reflected expansion waves, inflows and outflows in an appropriate sequence to maintain a flow of compressed cool gas to the heating (or combustion) chamber and to generate shaft torque by an efficient expansion of the hot gas from the heating (or combustion) chamber. This integral turbo-compressor wave engine appears outwardly similar to conventional gas turbines in that the rotor chambers, despite their multiple complex internal functions, collectively provide a steady flow and efficient expansion of hot gases. This engine differs markedly from conventional gas turbines in that the rotor utilizes alternating compression and expansion phases to perform both functions, compression and expansion, within the same rotor chambers. As a result of these alternating phases, this integral turbo-compressor wave engine, especially in the embodiments with movable blocks as illustrated in FIGS. 3 and 4, and movable pre-rotation vanes, can operate with good efficiency over a wide range of speeds. Where burning fuels are used as the heat source, it can maintain stable combustion (without surging) at low speeds and with low fuel consumption and it can generate substantial power (shaft, thrust, or compression) down to relatively low idling speeds.

Major advantages of the present engine stem from the alternating use of the rotor chambers for both cool gas compression and hot gas expansion or blowdown. Shock compression, using direct shock waves (44, 50) and the reflected shock wave 51 from the rotor nozzle constriction, permits the achievement of high compression ratios and high thermodynamic efficiencies without the size, weight, cost or complexities of multistage axial, centrifugal or other conventional compressors. In addition, use of the rotor chambers for shock wave compression of the cool intake gas(es) provides for automatic cooling of the rotor chambers as part of the basic operating cycle, without the use of special cooling ducts, vents or cavities, and without parasitic cooling flow processes in the rotor blades. The lower mean temperature experienced by the rotor and its blades, as a result of alternate exposure to cool as well as hot gases, permits (1) use of a high peak temperature for the hot gas, to achieve greater thermodynamic efficiency, (2) use of lower cost materials, in conjunction with conventional peak hot gas temperatures, or (3) an economically efficient compromise or combination of both higher peak hot gas temperature and lower cost materials.

An advantage of special importance is the resistance of this shock wave engine to stalling under rapid changes of load and speed. The tendency to stall during rapid acceleration, which besets all previous types of gas turbines, is effectively suppressed in this engine due to the fact that the cool gas 47 flow from the blower 15 is effectively isolated from the flow of the shock compressed cool gas 53 and the high temperature gas 49 in the high pressure loop. Furthermore, the high stagnation pressure available in the high pressure cool gas 53, combined with the way in which shock and expansion waves are propagated (both upstream and downstream), whenever heat is increased or decreased rapidly in the heating chamber 22, ensures stable flow in the high pressure loop, regardless of rapid variations in load and speed conditions. The foregoing is true because pressure waves developed in the heating chamber 22 as a result of sudden increases in heat input will reach the high pressure hot gas port 31 before pressure waves propagating upstream into the cool gas reach the cool compressed gas port 32, thus insuring the proper transient pressure gradients across the rotor.

A special applications advantage of the present shock wave engine stems from the fact that power may be easily taken off in a variety of ways, depending upon need. Much of the foregoing discussion has focused on maximizing shaft torque through multiple reentry and expansion stages on the compressor expander rotor. However, if direct thrust output (such as for aircraft propulsion) is desired, rather than shaft torque, reduction or elimination of reentry stages will permit the rotor torque to be reduced to the minimum required to maintain proper compression and adequate flow to the heating chamber. As a result a high proportion of the high temperature high pressure gas 54 can then be routed directly into a suitable duct or tailpipe to produce maximum thrust. In addition to shaft torque and direct thrust, a third method, desirable in certain applications, is to extract work in the form of compressed air or other compressed gas. The simplicity of the shock compression process and the high pressures attainable thereby cause this reflected shock wave engine to be particularly attractive in such applications. The heating chamber 22 of such an embodiment would be relatively smaller, because only a portion of the compressed gas (air) 53 would be circulated to the heating chamber to drive the rotor and to cause the shock compression of the cool gas.

The novel features of this integral turbo-compressor wave engine are generally applicable to heat energy extraction processes, including all feasible sources of heat, such as combustion, nuclear reactor, or solar furnace. These novel features are generally applicable to open cycle engines in which the working gas may be an ambient gas, such as air, taken in from and returned to the environment. It should also be understood that the present engine can operate as an open cycle engine wherein there is an unlimited source of heat, such as a by product at a refinery, and wherein the cool gas and hot gas are used only once and separated thereafter. They are also generally applicable to closed-cycle engines, in which the working gas is recirculated, from exhaust to intake, passing enroute through heat exchangers for cooling as necessary.

In the preferred embodiment, the engine stator is made of stainless steel to withstand the high temperatures which are constantly present. It should be understood that other materials, such as Inconel, could be used provided such materials can withstand high temperatures. The rotor in the preferred embodiment can be fabricated from stainless steel with 5% chromium or even some alloys of aluminum, because the mean temperatures of the rotor is not as high as that of the stator.

What we claim is:

1. A method for effecting a multi-staged expansion and reentry of high pressure gases from and into the chambers of a moving rotor comprising the steps of:
   a. expanding some of said gases from the chambers of said moving rotor thereby effecting once expanded gases;
   b. reducing, simultaneously with step (a), the pressure of said gases remaining in said chambers of said rotor thereby effecting once reduced pressure gases in said chambers;

c. expanding some of said once reduced pressure gases, in said chambers, from said chambers thereby effecting gases which have been subjected to two pressure reductions.

d. reducing, simultaneously with step (c), the pressure of said once reduced gases remaining in said chambers of said rotor thereby effecting twice reduced pressure gases in said chambers;

e. reentering said once expanded gases into the chambers of said moving rotor upon the completion of step (d).

2. In a rotary type engine which has a stator and a rotor, said stator having first and second sections disposed respectively on first and second sides of said rotor, and which rotor has a plurality of chambers and wherein each of said chambers has a gas inlet end and a nozzle of reduced cross-sectional area terminating in an outlet end and wherein said chambers are successively loaded, as they rotate past a selected location, with high pressure gases, means for effecting a multi-staged expansion of said high pressure gases comprising in combination:

first gas expansion port means formed in said first section of said stator and disposed to receive gases from said outlet ends of said nozzles, which are rotated to be open to said first gas expansion port, whereby said gases passing through said nozzles experience a first expansion and are expanded into said first gas expansion port means and whereby gases which do not pass through said nozzles but remain in said chambers experience a first reduction in pressure; second gas expansion port means formed in said first section of said stator and disposed in close proximity to said first gas expansion port means and further formed and disposed to receive gases from said outlet ends of said nozzles, which are rotated to be open to said second gas expansion port, whereby said gases passing through said nozzles experience a second expansion and are expanded into said second gas expansion port means and whereby gases which do not pass through said nozzles but remain in said chambers experience a second reduction in pressure;

first gas reentry port means formed in said second section of said stator and disposed to reenter gases onto said rotor through said gas inlet ends of said chambers, said first gas reentry port means disposed to reenter said gases, which experienced said first expansion, into said chambers which hold gases that have experienced said second reduction in pressure;

first gas return means connected between said first gas expansion port means and said first gas reentry port means to conduct said gases, which experienced said first expansion, to said first gas reentry port means.

3. Means for effecting a multi-staged expansion of gases according to claim 2, wherein said first expansion port means has a cross-sectional area of $A_1$ and said second expansion port means has a cross-sectional area of $A_2$ and wherein $A_2$ is greater than $A_1$.

4. Means for effecting a multi-staged expansion of high pressure gases according to claim 2, wherein there is further included a third expansion port means formed in said first section of said stator and disposed to receive gases from said outlet ends of said nozzles, which are rotated to be open to said third gas expansion port means, whereby said gases passing through said nozzles experience a third expansion and are expanded into said third gas expansion port and whereby gases which do not pass through said nozzles but remain in said chambers experience a third reduction in pressure;

second gas reentry port means formed in said second section of said stator and disposed to reenter gases onto said rotor through said gas inlet ends of said chambers, said second gas reentry port means disposed to reenter said gases, which experienced said second expansion, into said chambers which hold gases that have experienced said third reduction in pressure;

second gas return means connected between said second gas expansion port means and said second gas reentry port means to conduct said gases, which experienced said second expansion, to said second gas reentry port means.

5. Means for effecting a multi-staged expansion of gases according to claim 4 wherein said first expansion port means has a cross-sectional area of $A_1$, and said second expansion port means has a cross-sectional area of $A_2$, and said third expansion port means has a cross-sectional area of $A_3$ and wherein $A_3$ is greater than $A_2$, and $A_2$ is greater than $A_1$.

6. Means for effecting a multi-staged expansion of high pressure gases according to claim 4, wherein there is further included fourth expansion port means formed in said first section of said stator and disposed to receive gases from said outlet ends of said nozzles, which are rotated to be open to said fourth gas expansion port means, whereby said gases passing through said nozzles experience a fourth expansion and are expanded into said fourth gas expansion port means and whereby gases which do not pass through said nozzles but remain in said chambers experience a fourth reduction in pressure;

third gas reentry port means formed in said second section of said stator and disposed to reenter gases onto said rotor through said gas inlet ends of said chambers, said third gas reentry port means disposed to reenter said gases, which experienced said third expansion into said chambers which hold gases that have experienced said fourth reduction in pressure;

third gas return means connected between said third gas expansion port means and said third gas reentry port means to conduct said gases, which experienced said third expansion to said third gas reentry port means, 7. Means for effecting a multi-staged expansion of gases according to claim 6 wherein said first expansion port means has a cross-sectional area of $A_1$, and said second expansion port means has a cross-sectional area of $A_2$, and said third expansion port means has a cross-sectional area of $A_3$, and said fourth expansion port means has a cross-sectional area of $A_4$ and wherein $A_4$ is greater than $A_3$, and $A_3$ is greater than $A_2$, and $A_2$ is greater than $A_1$.

8. Means for effecting a multi-staged expansion of high pressure gases according to claim 6, wherein there is further included fifth expansion port means formed in said first section of said stator and disposed to receive gases from said outlet ends of said nozzles, which are rotated to be open to said fifth gas expansion port means, whereby said gases passing through said nozzles experience a fifth expansion and are expanded into said fifth gas expansion port means and whereby gases which do not pass through said nozzles but remain in said chambers experience a fifth reduction in pressure; fourth gas reentry port means formed in said second section of said stator and disposed to reenter gases onto said rotor through said gas inlet ends of said chambers, said fourth gas reentry port means disposed to reenter said gases, which experienced said fourth expansion, into said chambers which hold gases that have experienced said fifth reduction in pressure; fourth gas return means connected between said fourth gas expansion port means and said fourth gas reentry port means to conduct said gases, which experienced said fourth expansion to said fourth gas reentry port means.

9. Means for effecting a multi-staged expansion of gases according to claim 8 wherein said first expansion port means has a cross-sectional area of $A_1$, and said second expansion port means has a cross-sectional area of $A_2$, and said third expansion port means has a cross-sectional area of $A_3$, and said fourth expansion port means has a cross-sectional area of $A_4$, and said fifth expansion port means has a cross-sectional area of $A_5$ and wherein $A_5$ is greater than $A_4$, and $A_4$ is greater than $A_3$, and $A_3$ is greater than $A_2$, and $A_2$ is greater than $A_1$.

\* \* \* \* \*